US008667165B2

(12) United States Patent
Brabson et al.

(10) Patent No.: US 8,667,165 B2
(45) Date of Patent: Mar. 4, 2014

(54) DYNAMIC MODIFICATION OF APPLICATION BEHAVIOR IN RESPONSE TO CHANGING ENVIRONMENTAL CONDITIONS

(75) Inventors: Roy Frank Brabson, Raleigh, NC (US); Edward Glen Britton, Chapel Hill, NC (US); Wesley McMillan Devine, Apex, NC (US); Lap Thiet Huynh, Apex, NC (US); David B. Lindquist, Raleigh, NC (US); Bala Rajaraman, Raleigh, NC (US); Arthur James Stagg, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2844 days.

(21) Appl. No.: 10/045,556

(22) Filed: Jan. 11, 2002

(65) Prior Publication Data

US 2003/0135638 A1 Jul. 17, 2003

(51) Int. Cl.
*G06F 15/16* (2006.01)

(52) U.S. Cl.
USPC .......................................... 709/232; 709/223

(58) Field of Classification Search
USPC ................ 709/223, 224, 227, 232, 220, 203; 370/229–240
See application file for complete search history.

(56) References Cited

U.S. PATENT DOCUMENTS

| | | | | |
|---|---|---|---|---|
| 5,280,470 | A * | 1/1994 | Buhrke et al. | 370/232 |
| 5,414,845 | A | 5/1995 | Behm et al. | 395/650 |
| 5,457,687 | A | 10/1995 | Newman | 370/85.3 |
| 5,497,504 | A | 3/1996 | Acampora et al. | 455/33.2 |
| 5,530,695 | A | 6/1996 | Dighe et al. | 370/17 |
| 5,835,484 | A * | 11/1998 | Yamato et al. | 370/230 |
| 5,892,754 | A | 4/1999 | Kompella et al. | 370/236 |
| 5,938,743 | A * | 8/1999 | Nahidipour et al. | 710/22 |
| 6,041,366 | A | 3/2000 | Maddalozzo, Jr. et al. | 710/5 |
| 6,105,064 | A * | 8/2000 | Davis et al. | 709/224 |
| 6,381,628 | B1 * | 4/2002 | Hunt | 709/201 |
| 6,505,244 | B1 * | 1/2003 | Natarajan et al. | 709/223 |
| 6,529,475 | B1 * | 3/2003 | Wan et al. | 370/231 |
| 6,539,427 | B1 * | 3/2003 | Natarajan et al. | 709/224 |
| 6,587,875 | B1 * | 7/2003 | Ogus | 709/223 |
| 6,765,864 | B1 * | 7/2004 | Natarajan et al. | 370/224 |
| 6,782,422 | B1 * | 8/2004 | Bahl et al. | 709/224 |
| 6,859,435 | B1 * | 2/2005 | Lee et al. | 370/231 |
| 6,889,257 | B1 * | 5/2005 | Patel | 709/232 |
| 6,973,034 | B1 * | 12/2005 | Natarajan et al. | 370/232 |
| 7,200,651 | B1 * | 4/2007 | Niemi | 709/223 |
| 2001/0029548 | A1 * | 10/2001 | Srikantan et al. | 709/250 |
| 2002/0032780 | A1 * | 3/2002 | Moore et al. | 709/228 |
| 2003/0161265 | A1 * | 8/2003 | Cao et al. | 370/229 |

* cited by examiner

*Primary Examiner* — El Hadji Sall
(74) *Attorney, Agent, or Firm* — Steven L. Nichols; Van Cott, Bagley, Cornwall & McCarthy P.C.

(57) ABSTRACT

Methods, systems, and computer program products for dynamically modifying an application program's behavior in response to changing environmental conditions (such as network changes, system changes, and so forth). The application may solicit such information, and/or may receive unsolicited environmental change notifications. In response to a change notification, the application may take one or more of the following approaches to adapt to the changing conditions: (1) alter its execution; (2) modify its use of, or control of, other cooperating application; and (3) modify the selection of application execution threads. (An application might also decide to make no changes in its behavior.)

25 Claims, 25 Drawing Sheets

AS/DB.S = Application Server or Database Server
S/R = Switch/Router
MMS = Multimedia Server

| | Functional Area | Field | Description |
|---|---|---|---|
| 2110 | **Client** | | |
| | Field-1 | Available | Indicates system support status, e.g. yes/no |
| | Field-2 | Requested | Indicates whether another entity requested the function |
| | Field-3 | Options | Examples: levels of congestion, device class supported, QoS required, etc. |
| 2120 | **Network Platform** | | |
| | Field-1 | Available | Same as client |
| | Field-2 | Requested | Same as client |
| | Field-2 | Options | Examples: levels of congestion supported, type of network (LAN/WAN) |
| 2130 | **Remote Server** | | |
| | Field-1 | Available | Same as client |
| | Field-2 | Requested | Same as client |
| | Field-3 | Options | Examples: levels of congestion, storage constraints, processor constraints |
| 2140 | **Network Protocol** | | |
| | Field-1 | Available | Same as client |
| | Field-2 | Requested | Same as client |
| | Field-3 | Options | Examples: levels of congestion, system constraints, buffer constraints, active connection limit |
| 2150 | **System** | | |
| | Field-1 | Available | Same as client |
| | Field-2 | Requested | Same as client |
| | Field-3 | Options | Examples: levels of congestion, system storage constraints, processing constraints |

| | Functional Area | Field | Description |
|---|---|---|---|
| 2210 | **System Identifier** | | |
| 2211 | Field-1 | System type | Network platform, remote server, etc. |
| 2212 | Field-2 | Identifier type | Name, address, etc. |
| 2213 | Field-3 | System identifier | Actual identifier |
| 2220 | **Client** | | |
| | Field-1 | Available | Indicates system support status, e.g. yes/no |
| | Field-2 | Requested | Indicates whether another entity requested the function |
| | Field-3 | Options | Examples: levels of congestion, device class supported, QoS required, etc. |
| 2230 | **Network Platform** | | |
| | Field-1 | Available | Same as client |
| | Field-2 | Requested | Same as client |
| | Field-2 | Options | Examples: levels of congestion supported, type of network (LAN/WAN) |
| 2240 | **Remote Server** | | |
| | Field-1 | Available | Same as client |
| | Field-2 | Requested | Same as client |
| | Field-3 | Options | Examples: levels of congestion, storage constraints, processor constraints |
| 2250 | **Network Protocol** | | |
| | Field-1 | Available | Same as client |
| | Field-2 | Requested | Same as client |
| | Field-3 | Options | Examples: levels of congestion, system constraints, buffer constraints, active connection limit |
| 2260 | **System** | | |
| | Field-1 | Available | Same as client |
| | Field-2 | Requested | Same as client |
| | Field-3 | Options | Examples: levels of congestion, system storage constraints, processing constraints |

| | Functional Area | Field | Description |
|---|---|---|---|
| 2310 | **System Identifier** | | |
| | Field-1 | System type | Network platform, application server, etc. |
| | Field-2 | Identifier type | Name, address, etc. |
| | Field-3 | System identifier | Actual system identifier |
| 2320 | **Application Identifier** | | |
| | Field-1 | Type | Type of identifier: name, address, etc. |
| | Field-2 | Identifier | Actual identifier |
| 2330 | **Client** | | |
| | Field-1 | Return code | Success or failure |
| 2332 | Field-2 | Requested | Indicates whether another entity requested the function |
| | Field-3 | Options/returns | Mask indicating options supported |
| 2340 | **Network Platform** | | |
| 2341 | Field-1 | Return code | Success or failure |
| 2342 | Field-2 | Requested | Same as client |
| 2343 | Field-2 | Options/returns | Mask indicating options supported |
| 2350 | **Remote Server** | | |
| 2351 | Field-1 | Return code | Success or failure |
| 2352 | Field-2 | Requested | Same as client |
| 2353 | Field-3 | Options/returns | Mask indicating options supported |
| 2360 | **Network Protocol** | | |
| 2361 | Field-1 | Return code | Success or failure |
| 2362 | Field-2 | Requested | Same as client |
| 2363 | Field-3 | Options/returns | Mask indicating options supported |
| 2370 | **System** | | |
| | Field-1 | Return code | Success or failure |
| 2372 | Field-2 | Requested | Same as client |
| | Field-3 | Options/returns | Mask indicating options supported |

| | Functional Area | Field | Description |
|---|---|---|---|
| 2410 | **System Identifier** | | |
| | Field-1 | System type | Network platform, remote server, etc. |
| | Field-2 | Identifier type | Name, address, etc. |
| | Field-3 | Identifier | Actual identifier |
| 2420 | **Application Identifier(s)** | | May be more than one |
| | Field-4 | Type | Type of identifier: name, address, etc. |
| | Field-5 | Identifier | Actual identifier |
| 2430 | **Congestion** | | |
| | Field-6 | Level | Value indicating new congestion level |
| 2440 | **Optional codes** | | |
| | Field-7 | Number | Number of optional codes included |
| | Field-8 | Total length | Total length of all codes including this header |
| | Field-9 | First code | Optional code identifier |
| | Field-10 | Length | Length of this code |
| | Field-11 | Code | Actual code |

DYNAMIC MODIFICATION OF APPLICATION BEHAVIOR IN RESPONSE TO CHANGING ENVIRONMENTAL CONDITIONS

BACKGROUND OF THE INVENTION

1. Field of the Invention

The present invention relates to computer systems, and deals more particularly with methods, systems, and computer program products for dynamically modifying an application program's behavior in response to changing environmental conditions (such as network changes, system changes, and so forth).

2. Description of the Related Art

Today's global network is a complex interweaving of multiple network technologies, server platforms, client capabilities, and application requirements. A key application requirement is the ability to provide differing Quality of Service (hereinafter, "QoS") values, such as priority specification for specific units of work, such that more important traffic receives favored status in the allocation of server and network resources. FIG. 1 depicts a representative modem distributed computing environment 100, in which two classes 105, 110 of servers have been chosen arbitrarily on which to anchor the portrayed configuration. Note that there are many more types of servers than those shown, and that in reality, modem computing networks tend to be significantly more complex than the one shown. Nonetheless, environment 100 is sufficient to demonstrate the current networking environment and to illustrate advantages of the present invention.

The server classes 105, 110 shown in FIG. 1 represent (a) two multimedia servers 110 on which reside real-time, or near-real-time, applications and (b) one clustered server complex 105 with server instances 115 which support multiple differing applications. (The clustered server complex 105 is shown as having three instances 115, for purposes of illustration only. An actual clustered server complex might have more or perhaps fewer instances.) The applications which execute on these servers 105, 115 may perform a number of different types of functions, including transactions, queries, and large file transfers. The applications executing on the multimedia servers, for example, might transmit large amounts of data in the form of video streams or audio streams.

Client access to the servers and server complex is provided by a multiplicity of network media. In addition to being of various types, these media are also often separated by organizational boundaries. For example, one branch office of an enterprise might use Token Ring local area networks ("LANs") for connecting user devices, while a branch office with mobile personnel might rely more heavily on wireless media. The clients in the figure are shown as being connected by three different types of local network media attachment, and the clients having these types of attachment are designated in the figure as "cabled stations" ("CS"), "wide-area networking stations" ("wS"), and "wireless stations" ("WS"). As the terms are used herein, cabled stations are those connected by a LAN, and wide-area networking stations are those connected by a wide-area networking ("WAN") protocol. Representative examples of WAN protocols include: Frame Relay; Asynchronous Transfer Mode ("ATM"); variations of Digital Subscriber Line ("DSL"), also referred to collectively as "xDSL"; and so forth. Wireless stations are those connected using a wireless protocol.

Revisiting the discussion of the classes of servers which are accessible in the network, it is observed that the collective set of applications running on these servers transmits and receives data with varying characteristics. These characteristics include an aggregate amount of data sent/received per unit of time, whether the application has real-time requirements, sizes of data objects typically processed by the application, etc. Furthermore, within the course of a single logical unit of work, a single application may require the transmission/reception of data in multiple formats, where each of these formats may have its own attributes.

In some cases, QoS values are used as the subject matter of service contracts; in other cases, QoS values may simply represent user expectations. Processing data streams which have varying characteristics (such as those described above) in a manner that successfully meets QoS expectations requires the introduction of various workload management prioritization schemes. Consider the following broad classifications of data streams:

Real-Time Data: Real-time, or time-sensitive, data must be delivered in an ordered and highly predictable manner, such that data reception by the client is perceived as a single uniform stream. An example of real-time data is transmission of a digital video file.

Mission-Critical Data: Mission-critical data may be a customer transaction, an interactive inventory control program, or any other operation deemed critical to the successful operation of a particular business. For example, a customer's order to purchase goods or services may be considered mission-critical for an e-commerce business.

Non-critical Data Transfers: Non-critical data transfer does not imply that the data stream is not important. It simply implies a lower need for immediate delivery and processing of the data, as opposed to mission-critical or real-time data transfer. An example of non-critical data transfer may be downloading an image from an on-line catalog.

As will be obvious, the detailed definition of these rather broad classifications (i.e., what type of data falls into each category) may vary from one enterprise to another. It will generally be true, however, that all enterprises will require that servers and networks order the processing of data such that higher-priority data is processed and transferred ahead of lower-priority data. The term "Quality of Service" is often used to describe this ordering requirement, and ordering or prioritization techniques are generally applicable to both server-based technologies and network technologies.

FIG. 2 depicts a simple computing environment 200 that may be using current QoS techniques. While the figure depicts a relatively simple configuration, it is sufficient to demonstrate the problems that arise in providing the proper ordering of traffic flow. The figure shows data flowing from the server cluster 105 and a multimedia server 110 to a set of clients (depicted as C.1, C.2, C.3, and C.4) that share the same LAN 220. In this example, assume that clients C.1 and C.3 are receiving data from two different applications resident on a selected one of the servers within the cluster 105. (Alternatively, each of these clients may be receiving data from a different one of the clustered servers.) Also assume that the other clients C.2 and C.4 are part of a multicast broadcast of a video stream from multimedia server 110, and that traffic destined for this set of four clients shares the WAN facilities 215 as well as the router gateway 225 (denoted as "S/R1" in the figure) to their (shared) local LAN 220.

In the example scenario of FIG. 2, suppose that the high packet volume for the multimedia traffic sent to clients C.2 and C.4 completely overwhelms the capabilities of the router gateway 225, or perhaps of the LAN 220. In this situation, the traffic flow for application data sent to clients C.1 and C.3 will be degraded, and some data may even be discarded before it reaches the clients. Client C.1 might be interacting with an application program that performs some type of relatively low-priority function, for which this traffic degradation is not a serious issue. However, client C.3 might be performing a mission-critical transaction. Thus, it is necessary for a QoS strategy to be in place to ensure that the differing requirements of the clients are met.

Both server-based and network-based prioritization technologies are commonly used in the prior art to provide traffic ordering in this type of environment in order to allow the mission-critical transactions to flow ahead of lower-priority traffic without disruption of the real-time video stream.

Regarding server-based mechanisms, there exists a set of services that allow the user (such as a systems administrator) to specify which task is to receive priority utilization of system resources, e.g. storage, central processing unit ("CPU") share, etc. These prioritization services are typically platform-specific and vendor-specific, and are generally more sophisticated on more advanced platforms, such as OS/390®, AIX®, Solaris™, etc. In addition, the techniques used to assign resources to a task are generally non-standard and vary with the platform and vendor. ("OS/390" and "AIX" are registered trademarks of the International Business Machines Corporation, hereinafter "IBM", and "Solaris" is a trademark of Sun Microsystems, Inc.)

Network-based prioritization mechanisms generally act to associate a given traffic stream, connection, or individual packet with a user-requested and system-approved transmission priority. These prioritization mechanisms may be media-specific (such as ATM QoS specification techniques) or network protocol-specific. Examples of the latter case include Advanced Peer-to-Peer Networking ("APPN") class of service ("COS") features and the Transmission Control Protocol/Internet Protocol ("TCP/IP") differentiated services protocol (which is sometimes referred to as "DiffServ"). APPN COS values are derived from a mode name specified by a session initiator, and DiffServ values are specified by setting a bit pattern of a particular field in IP packet headers.

Typically, the combination of server-based (or, equivalently, "system-based") and network-based prioritization mechanisms act in concert to ensure that higher-priority network traffic is processed ahead of lower-priority traffic. These mechanisms may also act to ensure that required data stream attributes are realized. For example, the reduction of jitter in real-time data streams is an attribute that may be controlled in this manner. (In this context, the term "jitter" refers to non-uniform time intervals for delivery of real-time data streams. Bad cases of jitter may result in video or audio interference.) Because the various mechanisms use vendor-specific, media-specific, and/or network protocol-specific techniques, however, as discussed above, there is a huge administrative burden placed on system providers and network providers to coordinate and control the mechanisms to ensure that the result is a properly-tuned system. Dynamic, often unpredictable changes to the environment make this task even more daunting.

Therefore, even with the constantly-improving technologies which are being deployed in today's servers and networks, improvements are required to achieve optimal QoS control, and in particular to ensure that user expectations, including contracted system and network service levels, can be met.

SUMMARY OF THE INVENTION

An object of the present invention is to define techniques for improving quality of service.

Another object of the present invention is to provide improved application traffic delivery.

An additional object of the present invention is to provide improvements in traffic delivery which incorporate input regarding network conditions as well as server-based input data.

A further object of the present invention is to provide improvements in traffic delivery by dynamically modifying an executing application's behavior.

Still another object of the present invention is to provide techniques which allow application behavior to be modified based on network conditions and/or server-based information.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in a first aspect the present invention provides methods, systems, and computer program products for improving data transfer in computing networks. Preferably, the technique of this aspect comprises: detecting a changed environmental condition; generating a notification of the detected condition; analyzing the generated notification by consulting one or more criteria; and determining, based on the analysis, whether a currently-executing application should modify its behavior. The technique preferably further comprises the currently-executing application then modifying its behavior.

A number of types of modifications made be made, including (by way of illustration): reducing (or increasing) a size of one or more data objects generated by the currently-executing application; reducing (or increasing) data retrieval by the currently-executing application; dropping one or more connections with the currently-executing application; changing thread assignments of the currently-executing application; and changing the currently-executing application's use of one or more other applications.

The changed environmental condition may pertain to system-related conditions, network-related conditions, or client-related conditions in one or more clients of the currently-executing application.

The changed environmental condition may occur internally to a system in which the currently-executing application is executing, or externally to such a system. In the former case, the generated notification may pertain to (inter alia) a condition of a local network protocol stack, or to a condition of the system in which the currently-executing application is executing. In the latter case, the generated notification may pertain to (inter alia) a condition of a client of the currently-executing application, a condition of a remote network platform, or to a condition of a remote server with which the currently-executing application is communicating (in which case the modification may comprise making adjustments pertaining to the remote server).

The analyzing may be done by a policy manager component of the system in which the currently-executing application is executing.

In another aspect, the present invention comprises methods, system, and computer program products for dynamically modifying behavior of an executing application in response to changing environmental conditions, comprising: exchanging information among multiple components of a network as to each component's support for environmental awareness; detecting, by a selected one of the components, an environmental change; determining, responsive to the detecting, those other ones of the components which indicated an interest in the detected environmental change during the exchange; notifying those other ones of the detected environmental change; and dynamically modifying behavior of an application currently executing at one or more of the notified components, in order to account for the detected environmental change.

The present invention may also be used advantageously in methods of doing business, for example to provide improved service provider offerings whereby data transfer rates are improved.

The present invention will now be described with reference to the following drawings, in which like reference numbers denote the same element throughout.

BRIEF DESCRIPTION OF THE DRAWINGS

FIGS. 21-24 depict data structures or "vectors" that may be used for communicating information among components.

DESCRIPTION OF PREFERRED EMBODIMENTS

The present invention discloses novel and advantageous techniques for controlling the performance of a computing system to ensure that user expectations can be met (including those expectations that form the subject matter of QoS agreements, which are sometimes known as "Service Level Agreements" or "SLAs"). According to the present invention, an executing application dynamically modifies its behavior in response to changing environmental conditions. These changing conditions include network changes and system changes. Network changes include whether the network is experiencing congestion, whether there are outages in the network, and so forth. System changes include things such as buffer shortages, thread scheduling problems, and other resource shortages. (Note that while discussions herein are primarily in terms of detecting problems of one type or another, "changing conditions" may also be interpreted in a positive sense, such as when a problem has been alleviated and a network or system is returning to more normal operations. These types of positive changes are also included within the scope of the present invention. Furthermore, it should be noted that the conditions or problems described herein are merely illustrative, and the description is not intended to provide an exhaustive list.)

An executing application may solicit information about current environmental conditions, and/or it may receive unsolicited change notifications. In response to a change notification, the application may take one or more of the following approaches to adapt to the changing conditions: (1) alter its execution; (2) modify its use of, or control of, other cooperating application; and (3) modify the selection of application execution threads. Or, depending on the particular change, the application might alternatively make no changes in its behavior.

As one example of how an application might alter its execution, according to the techniques disclosed herein, suppose an executing application receives notice that the network is currently severely congested. If the application continues to send large amounts of data to its clients, the congestion problem is likely to get even worse—and the data might be discarded (e.g., as a particular device in the network experiences an overrun situation). Therefore, the application may determine to produce less data, or not retrieve certain data, for sending to one or more of its clients until the congestion problem is alleviated.

Figure 1:
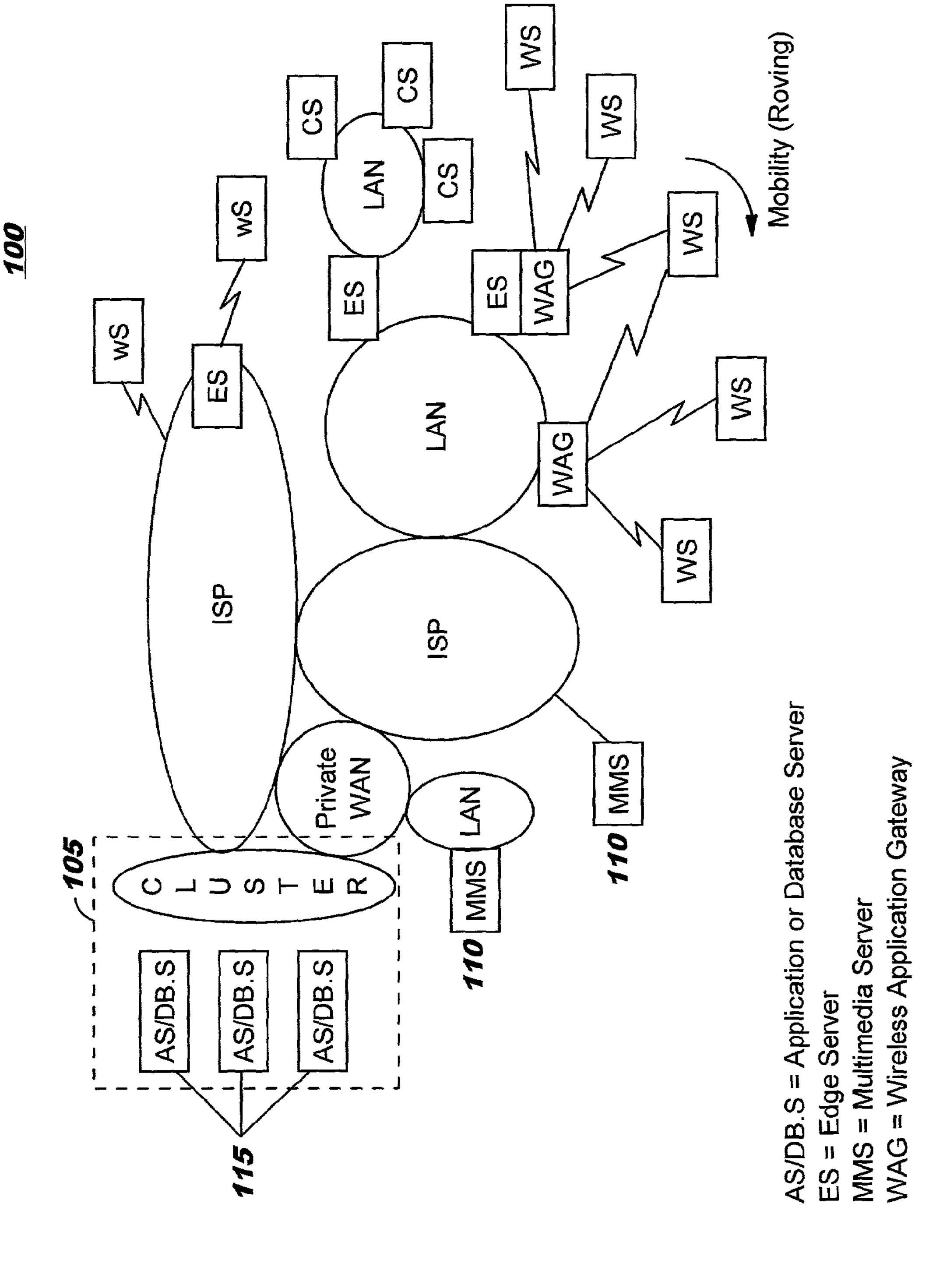
FIG. 1 shows a representative modem distributed computing environment, according to the prior art.
Figure 2:
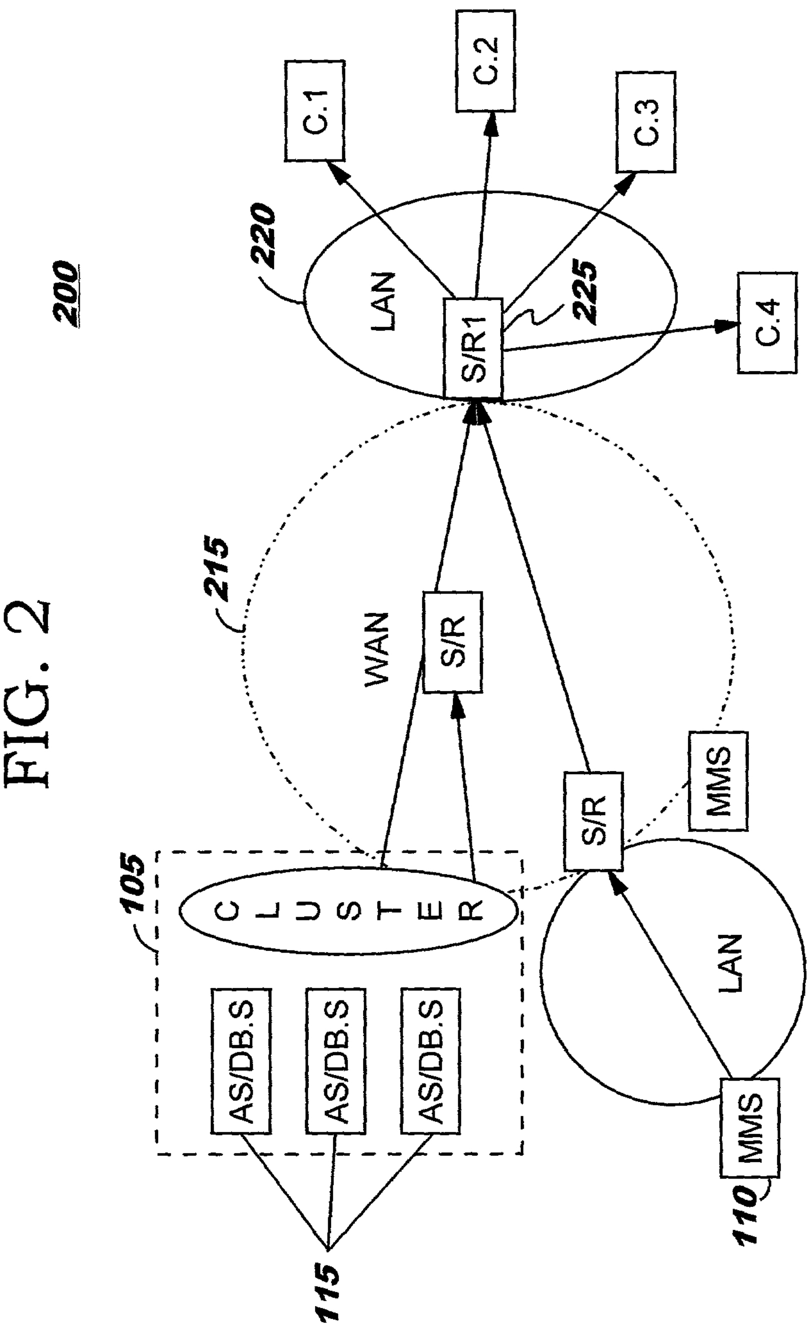
FIG. 2 illustrates traffic flow in a simple computing environment of the prior art.

To expand on this example in more detail, suppose that the multimedia server 110 from the scenario illustrated in FIG. 2 is sending its video stream to clients C.2 and C.4 (and possibly to many other clients as well) using the well-known MPEG transmission format. To achieve a high-quality picture, server 100 may be transmitting some number "n" of cells or frames per second. If the network path to one or more of the receiving clients becomes congested, or perhaps a remote router between the server 110 and particular clients experiences overrun, then an appropriate notification back to the multimedia application which is generating the video stream may result in the application deciding to begin sending on "n−p" frames per second. The actual values of "n" and "p" are not significant to the present discussion; what is of importance is that some reduction in the amount of data being generated will occur. Thus, the application is able to impact the delivery of traffic at the traffic source.

Commonly-assigned U.S. Pat. No. 6,138,156, which is titled "Selecting and Applying Content-Reducing Filters Based on Dynamic Environmental Factors", discloses techniques whereby dynamic environmental factors can be used to filter message content, with the aim of reducing the amount of data to be transmitted under certain conditions. A plurality of filters is available for reducing message content. Depending on the current conditions, one of these filters is selected and applied. As an example, content reduction may be achieved by transcoding a file containing a full-color image file to create a smaller gray-scale image. Preferred embodiments account for conditions such as the user's device type; billing information about the user's connection to the network; current conditions on the workstation, including its available storage capacity; this user's behavior patterns; or any combination of these or similar factors, and it was filed Nov. 17, 1999

Commonly-assigned U.S. patent application Ser. No. 09/442,015, filed Nov. 17, 1999), which is titled "Context-Sensitive Data Delivery Using Active Filtering", discloses techniques whereby a server pre-filters data to be delivered to a client based upon factors such as the client device type, preferences of a user of that device, and the user's current location. By pre-filtering the data, it can be made available to the user more efficiently. As an example, an application may be creating content for a general audience, or may have already created that content (e.g. as in the case of static Web pages which are created and stored for subsequent transmission to requesters), expecting that content to be received at a full-function computer. According to U.S. patent application Ser. No. 09/442,015, the server may create one or more alternative versions of this content for transmission to requesters who do not have a full-function computer, such as for those users requesting the content from a network-accessible cellular phone or a handheld computing device.

The techniques disclosed by these two U.S. patents modify an already-generated file or traffic stream, This is in contrast to the present invention, where the file or traffic stream is adapted for the current environmental conditions during its creation—that is, by the application which originally creates the data.

Figure 3A:
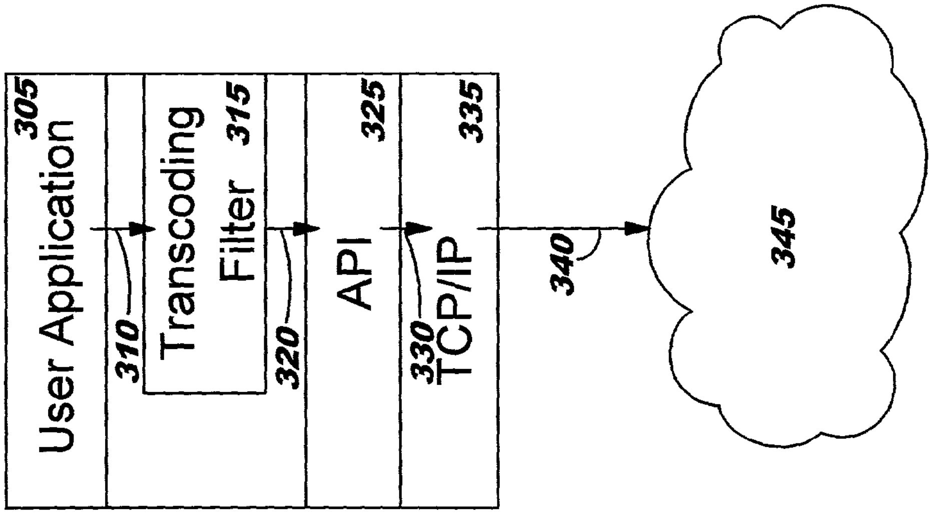
FIGS. 3A and 3B contrast the technique of preferred embodiments to the approach of two prior art patents.
Figure 3B:
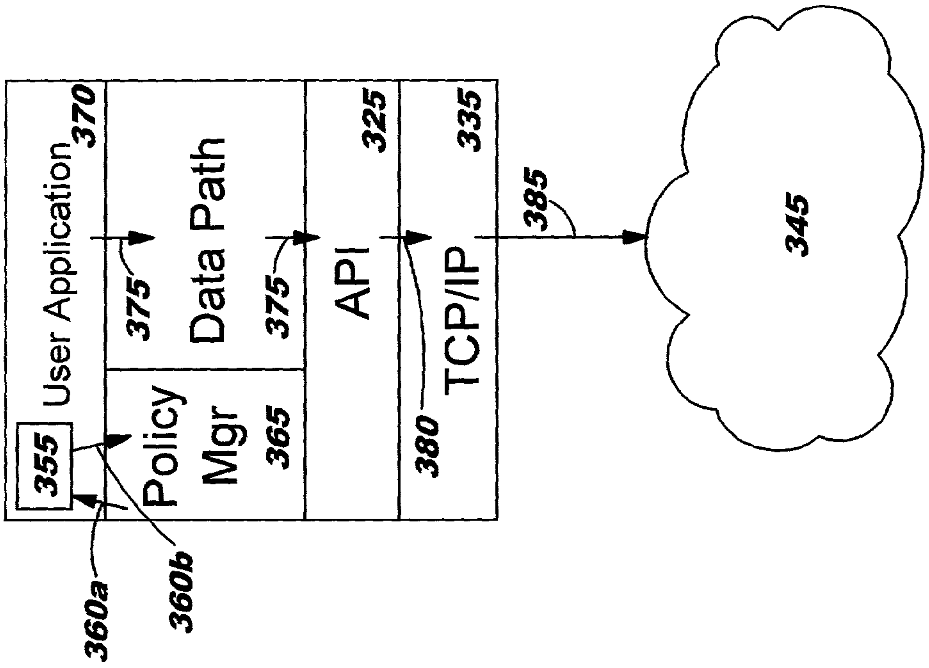

FIGS. 3A and 3B illustrate these differing approaches. In the prior art approaches illustrated by FIG. 3A, a user application 305 generates (or retrieves) data and sends 310 this data through a transcoding filter 315, which may reduce the content of the data depending on particular factors. The modified data is then sent 320 to an application programming interface ("API") 325, with which it reaches 330 a TCP/IP stack 335. The stack 335 then sends 340 the modified data to a network 345 for transmission to a user. (Note that the prior art approach shown in FIG. 3A has been simplified for ease of illustration. The techniques disclosed in the prior art patents may operate at a server other than the application server which originally generates/retrieves the data content.) The application, however, is not aware of the environmental conditions and does not modify its execution based on such conditions.

In the present invention, as illustrated by FIG. 3B, a user application 370 still generates or retrieves data for eventual transmission to a user. However, a component which is referred to herein as a "policy manager" 365 provides input 360*a* to an application-layer component 355 as to current environmental conditions, and application 370 considers this input 360*a* during its execution. Therefore, when application 370 has outbound data to send 375 through API 325 for forwarding 380, 385 to network 345 for delivery to the user, this data is already modified. (Policy manager 365 may also receive information from the application-layer component 355, as indicated by flow 360*b*. This will be described in more detail below.) Note that the application-layer component 355 which is depicted as interacting 360*a*, 360*b* with the policy manager 365 is not necessarily a stand-alone component, as it has been illustrated in FIG. 3B. The functions of such a component, which will be described below, may be included directly within an application 370 if desired.

It may happen that the output generated from using the present invention reaches a system or component which performs transcoding, including a system or component which implements the techniques of the two U.S. patents which have been discussed. When the application 370 operating according to the present invention learns from the policy manager 365 that (by way of example) the network is congested and therefore determines that it should send less outbound data, however, the need for applying a subsequent transcoding operation may be eliminated. (Or, it might happen that the data is still transcoded, but that a "less severe" type of content reduction can be performed in that transcoding operation.) Some transcoding operations may be relatively expensive to perform, in terms of processing time, CPU consumption, etc. Therefore, avoiding the need for transcoding by transmitting less data from the source (i.e. from the application) provides a very advantageous approach to an overall traffic infrastructure.

Figure 4:
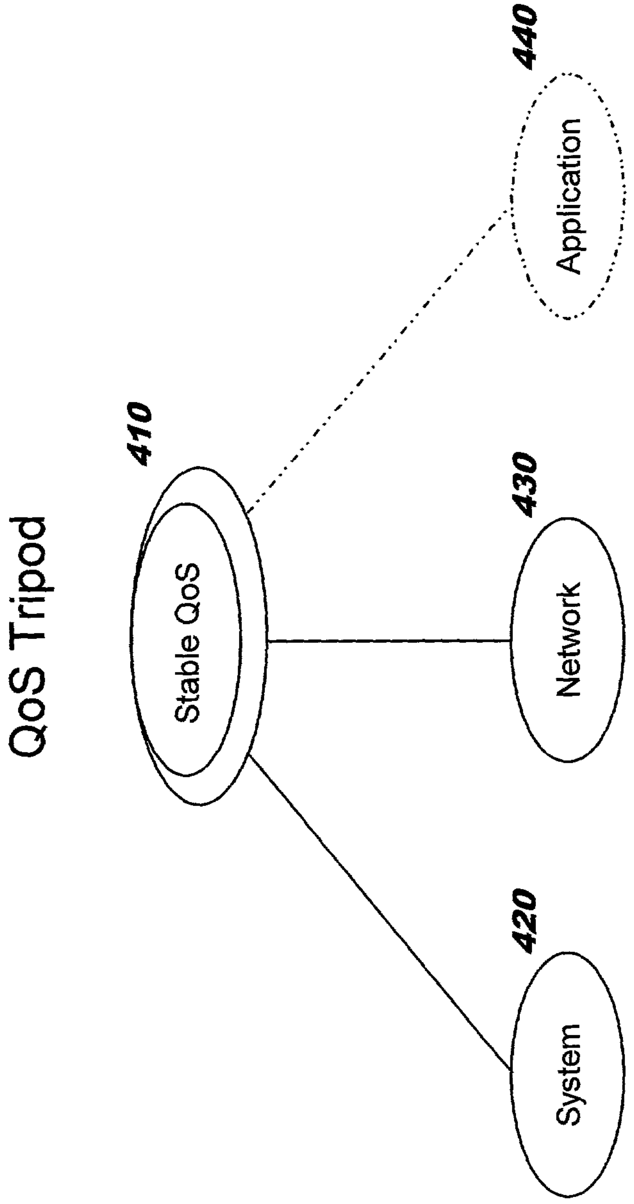
FIG. 4 illustrates that a total QoS solution is made possible by the present invention.

Adequate provisioning of a robust traffic management scheme may be likened to the tripod shown in FIG. 4. Current technology is providing the system 420 and network 440 "legs" for the provisioning of the establishment of a robust and stable QoS infrastructure 410. What is missing, and what is provided by the present invention, is the third "leg" of the tripod, whereby the application 440 also participates in ensuring that traffic management operates efficiently and effectively.

Consider the nature of the problem that occurs without application participation. Returning to the prior art scenario which was discussed with reference to FIG. 2, if network congestion increases to a point where existing QoS levels can no longer be met, there is no alternative other than the discard of data and the negation of existing QoS agreements. Because QoS agreements may be tied to service pricing (e.g. in SLAs), this is a very undesirable situation. The existing technology provides no means by which the ultimate traffic "generator", i.e. the application, may be alerted so that it can potentially modify its execution with the goal of reducing the traffic that enters the system and/or network. Hence, in the example of FIG. 2, there is no means to automatically reduce the video stream being generated by the multimedia server 110 for delivery to clients C.2 and C.4, based on dynamic conditions, when using prior art solutions. If the low-priority function being performed by client C.1 is requesting delivery of a Web page, there is no means to automatically modify the contents of that Web page (or perhaps to decide that some embedded content should not even be requested by the application). And, finally, there is no way to automatically reduce the contents of a transaction record size for the mission-critical transaction being performed by client C.3.

In summary, without the ability to modify the behavior of the application which generates the traffic, there is no total solution to the traffic management problem available in the prior art. The present invention provides novel and advantageous techniques for solving this problem. Using the disclosed techniques, more informed decisions can be made regarding tradeoffs between the utilization of server, network, and application resources.

Figure 5:
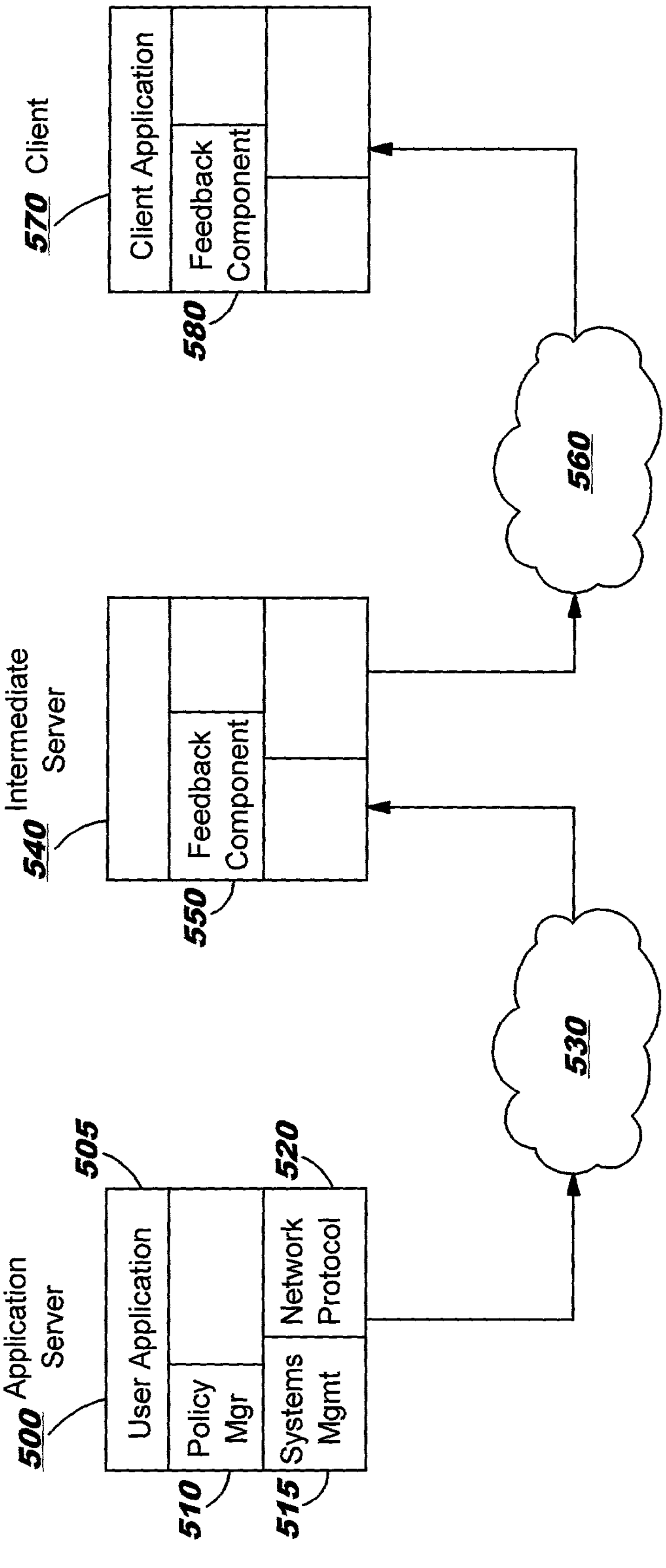
FIG. 5 illustrates an architecture which may be used to exchange information among devices and components for carrying out preferred embodiments of the present invention.

FIG. 5 illustrates an architecture which may be used to exchange information among devices and components (referred to hereinafter simply as "components" for ease of reference) for carrying out preferred embodiments of the present invention. As shown therein, application server 500 according to the present invention is augmented to include a policy manager 510. In addition, application server 500 typically includes systems management functions 515 and network protocol functions 520. Both the systems management and network protocol functions 515, 520 may provide input to policy manager 510 as to current environmental conditions, which policy manager 510 then forwards to user application 505. This input may represent the status of application server 500 or its connection to a network 530. Input may also be received from other components and forwarded to application 505 on behalf of those other components (by, for example, the policy manager 510). The other components are illustrated in FIG. 5 by an intermediate server 540, a client device 570, and a network 560 which connects them.

Intermediate server 540 is depicted as including a "feedback component" 550, and client device 570 is also shown as having a feedback component 580. (The feedback component may alternatively be referred to as a "policy agent" or "remote policy agent".) This feedback component represents one or more functions which gather information about current conditions, and provide notifications to selected other components (which preferably includes, but is not limited to, application server 500). The notifications may be sent automatically, in response to a triggering condition such as exceeding a particular defined threshold. Or, the notifications may be sent in response to an explicit request for another component (such as application server 500). Support for these functions may be provided in selected components within the networking environment. Client support, while shown in FIG. 5, is optional. A particular implementation of the present invention may communicate with some clients which provide this support, and simultaneously with others which do not. Similarly, it is not strictly required that the feedback component is present in all intermediate servers or in the entire collection of other devices (such as routers and switches) which support the network. The example structure shown in FIG. 5 is therefore to be considered as illustrative and not as limiting.

Preferably, a feedback component sends outbound notifications of at least one of the following types of conditions: the local application has changed its resource prioritization (which may, in turn, impact the application's ability to process inbound traffic); the local system has a changed capacity (for example, due to higher-than-normal local processing demands); capacity changes have been detected in the network (which may, in turn, impacts the local device's ability to receive and/or forward traffic). A feedback component may also serve as a policy manager for the local application, and therefore may communicate inbound environmental information to its local application. This inbound information may comprise locally-detected conditions of the type just discussed, or similar information which has been received from other components in the network.

It should be noted that while the discussions herein are primarily in terms of notifications being received (or conditions being detected) that result in communicating to the executing application, a particular implementation may optionally provide rules or filters which first evaluate those notifications or conditions, and make a decision about whether to notify the application. For example, a policy manager in an application server might be communicating with a large number of client devices. An outage or degradation notification that pertains to only one, or some limited number, of these devices might not warrant changing the application's behavior. The policy manager may thus incorporate additional knowledge, such as a knowledge of how many other clients are currently being served and perhaps anticipated changes in that workload, before deciding to notify the application of a problem. (Alternatively, such information can be used as input to a decision made by the executing application.)

When an application has been notified of a problem, the action(s) it takes may vary. The application may reduce the amount of data it sends to one or more clients, as has been discussed. Or, the application might completely drop one or more connections. And in some cases, the application might choose to ignore the notification. The appropriate response to a particular notification that may be received according to the present invention is application-dependent, and is outside the scope of the present invention. For ease of reference, the term "prioritization action" is used hereinafter to refer to the action or actions taken by the executing application in response to receiving a notification; a prioritization action may be any of the actions just described, or any other type of behavior change that is taken in response to a notification.

The mechanisms with which problems are detected in a system or in a network protocol or device also do not form part of the present invention. Such mechanisms are generally known in the art. Use of the present invention enables conveying environmental condition information among entities using protocols and data structures which are system-neutral, platform-neutral, and vendor-neutral. Processing that occurs within various network components to support the flows of this protocol will now be described with reference to the flowcharts in FIGS. 6-20 and the data structures, or vectors, in FIGS. 21-24.

Each component which is adapted to perform functions of the present invention (or a subset of those functions) preferably generates an "internal capabilities vector" when that component performs its initialization process for the present invention. The vectors (or a functional equivalent thereof) are used to store information about the component's capabilities; when the component is subsequently queried as to its capabilities, the vector may be used to create a response message. The information in the vectors therefore forms the basic unit of information exchange when communicating among components as to their capabilities (whether those components are located within a single system or are located in multiple systems). The process of creating these vectors in a user application (or its supporting middleware which acts on its behalf), a local policy manager, a local network protocol, a remote server, and a network platform, respectively, is depicted in FIGS. 6-10.

As the user application or its supporting middleware initiates its activation (Block 600) of the present invention, it creates its version of the "internal capabilities" vector. (References hereinafter to the user application should be interpreted as pertaining alternatively to its middleware, if the middleware provides this support on behalf of the application.) In the case of the user application, this vector may more correctly be termed an "internal request" vector, as it stores information about what capabilities should be requested from other components.

In preferred embodiments, a user such as a network administrator defines which components the user application should monitor/consider when making decisions regarding prioritization actions. This information may be obtained by prompting the user from a user interface, by reading data values which have been stored in a configuration file, or in other similar manners. In addition, the information may be supplied programmatically, for example by intelligent middleware which is adapted for this purpose. (As an alternative to obtaining this type of information dynamically, the information could be specified directly within the application code; however, preferred embodiments use the more flexible approach described herein.) Furthermore, a user preferably configures each component that is to participate in the dynamic application modification process disclosed herein. This component-level configuration preferably comprises specifying what types of information each component can provide, and may include more detailed information where appropriate. (For example, the user might configure a remote server to indicate that it can provide congestion information. If the server can provide information on several different degrees of congestion, then the user preferably specifies that as well.)

Figure 6:
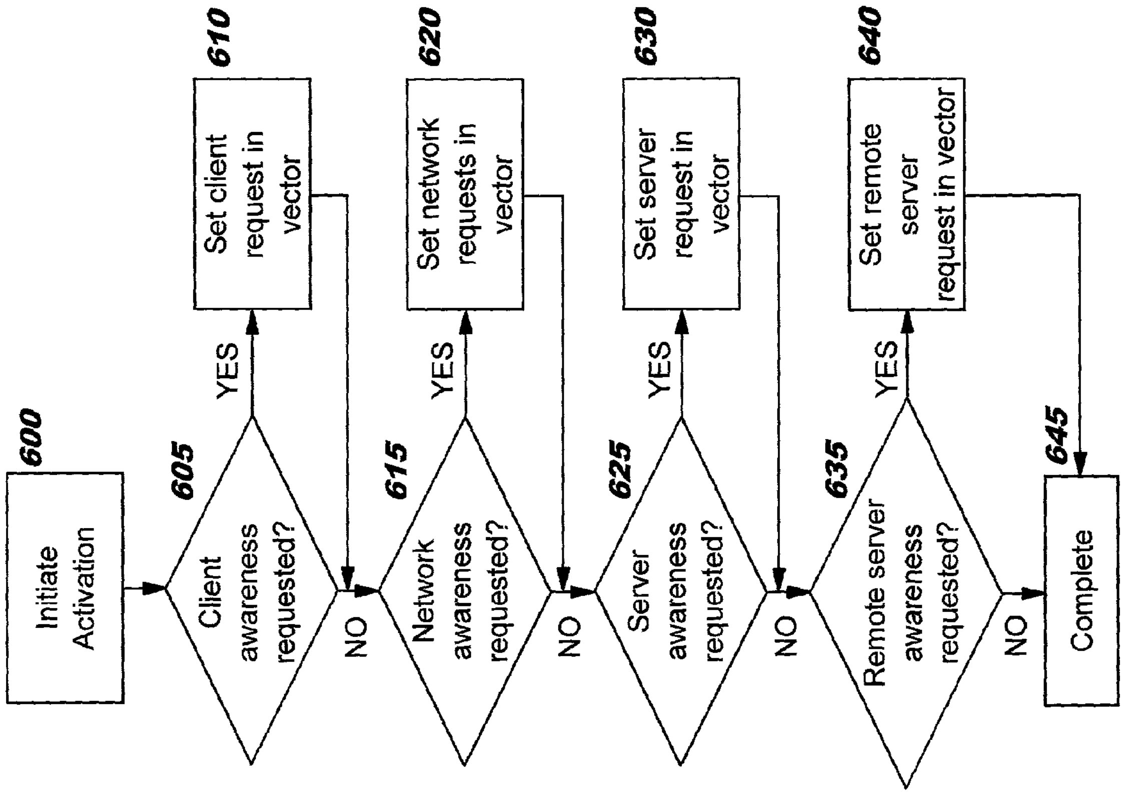
FIGS. 6-20 provide flowcharts depicting logic that may be used to implement preferred embodiments of the present invention.

Returning to the discussion of FIG. 6, the user application's internal capabilities/request vector will subsequently be used to create a request message that will be transmitted as a query to the policy manager to request information about what support is available. Upon receiving the request message, the policy manager will then create a response message which preferably comprises a revised version of the vector. This revised version preferably includes a response to each requested field from the application's request message, where the response indicates whether each of the requested capabilities is available. (Logic that may be used to implement this request and response processing is described below.) Therefore, the processing in FIG. 6 determines those things for which the user has configured the application to request support. Beginning at Block 605, a test is performed as to whether this application wishes to receive information about its clients. This is represented in FIG. 6 as "client awareness requested?". If this test has a positive result, then Block 610 sets a value 2112 in the application's internal capabilities vector 2100. Optionally, Block 610 may also set one or more values in field 2113. FIG. 21 provides an example format and content for the internal capabilities vector, as will now be described.

Preferably, the internal capabilities vector is structured in functional areas which correspond to client information (see element 2110), network platform information (element 2120), remote server information (element 2130), network protocol information (element 2140), and system information (element 2150). Within each of these functional areas, a similar field layout is preferably used. In preferred embodiments, three fields are used within each functional area The first field represents availability of information from the corresponding entity (e.g. availability of client information from one or more clients, in field 2111; availability of remote server information from one or more remote servers, in field 2131; etc.). The value of this field will be set in the user application's internal capabilities/request vector in response to learning that the corresponding support is available. This availability field may be implemented as a binary value when only a yes/no value is deemed necessary. The second field represents that the corresponding information is requested by the entity having this internal capabilities/request vector (i.e. by the application, with reference to the processing in FIG. 6), and may also be implemented as a binary value. For example, when field 2152 is set to "1", this indicates that the application wishes to receive information from the policy manager about the local system. The third field may be used to represent one or more options, and may be implemented as a bit string or as particular groups of bits. The fields in the internal capabilities vector are referred to hereinafter as the "available", "requested", and "options" fields, respectively.

Use of these fields with reference to client support will now be described. During operation of Blocks 605 and 610, if the user application wishes to receive client input, then a bit in field 2112 is set to "1". In a subsequent transmission of the user application's internal capabilities vector to the local policy manager, the policy manager sets a bit in field 2111 to a "1" to indicate that clients are able to send information on their conditions to this user application. (Therefore, field 2111 should be initialized to false or "0" during operation of Block 610.) Various types of information can be conveyed through field 2113, such as whether client congestion is currently present (or, alternatively, varying degrees of congestion); QoS requirements of this application's clients; device classes supported by this application's clients; etc. The type of information which is deemed useful in field 2113 may vary from one implementation to another. An enterprise-wide scope for further defining this field may therefore be adopted. Or, for operation in a more wide-reaching environment, a particular interpretation may be prescribed.

The user application may also set values in options field 2113, regarding information it wishes to query from the policy manager about the corresponding entity's support or current status (depending on the semantics of the particular values). For example, the application may set a bit defined as congestion yes/no to "1" within field 2113 to indicate that when the policy manager receives vector 2100, its response should leave this bit set to "1" if clients are experiencing congestion (or perhaps congestion beyond some defined threshold), but that this bit should be set to "0" if the clients are not congested. Similarly, if one or more "congestion level" bits are used to convey degrees of congestion, the application may set one (or more) of this bits to indicate that it wishes to query the policy manager about what the clients' current congestion level is. The policy manager may then set all the congestion level bits to "0" if congestion is not currently a problem, or may use other bit patterns to indicate differing levels of client congestion.

The fields within the network platform functional area 2120 are preferably structured in an analogous way to those of the client functional area 2120. That is, three fields are preferably used, where the first is an available field, the second is a requested field, and the third is an options field. (The other functional areas 2130, 2140, 2150 are also preferably structured in this same way.) The semantics of the first two fields 2121, 2122 are preferably identical to those which have been described for fields 2111 and 2112. (The semantics of the first two fields in the other functional areas are also preferably identical to those which have been described.) Options field 2123 may indicate various information which is pertinent to the network platform, including its current congestion, the type of network (such as LAN or WAN), and so forth.

Options field 2133 in the remote server functional area 2130 may indicate various information which is pertinent to the remote server, including its current congestion, any storage constraints, any processor constraints, etc. Options field 2143 in the network protocol functional area 2140 may indicate various information which is pertinent to the network protocol, including its current congestion, any system constraints, any buffers constraints, active connection limits, etc. Finally, options field 2153 in the system functional area 2150 may indicate various information which is pertinent to the system, including its current congestion, any system storage constraints, any processing constraints, etc.

Applications may use the options field within any of the vectors described herein to fine tune their reaction(s) to changing conditions. A bit mask or other suitable programming technique may be used for analyzing contents of the options field. Preferably, each functional area supports "congestion" or "levels of congestion" in its options field, and when the bit(s) for congestion is/are set to zero, this is an indication of no congestion.

Returning again to the discussion of FIG. 6, Block 615 checks to see if this application wishes to receive information from the network. If so, Block 620 preferably sets values 2122, 2142 to indicate this request. (Alternatively, the logic in FIG. 6 may be modified to perform separate determinations as to (1) the network platform, e.g. switches and routers in the network, represented by functional area 2120 of the internal capabilities vector 2100; and (2) the network protocol in the application server, represented by functional area 2140.)

Next, Block 625 checks to see if this application wishes to receive information from the local server. If so, Block 630 sets value 2152 to indicate this request. Finally, Block 635 checks to see if this application wishes to receive information from the remote server. If so, Block 640 sets value 2132 to indicate this request. The user application's initialization of its internal capabilities vector is then complete (as indicated by Block 645).

The policy manager and other components preferably use the same structure shown in FIG. 21 for their own internal capabilities vector, as stated earlier. If one or more functional areas are not pertinent for a particular component, the functional area may be omitted from the vector; or, the vectors may all be implement in a uniform manner. Furthermore, while a number of different capabilities are supported by the tests in FIG. 6 (and in FIGS. 7-10) and the corresponding vectors 2100, a particular implementation may alternatively choose to support a subset of these capabilities. In that case, the vectors are modified accordingly.

Figure 7:
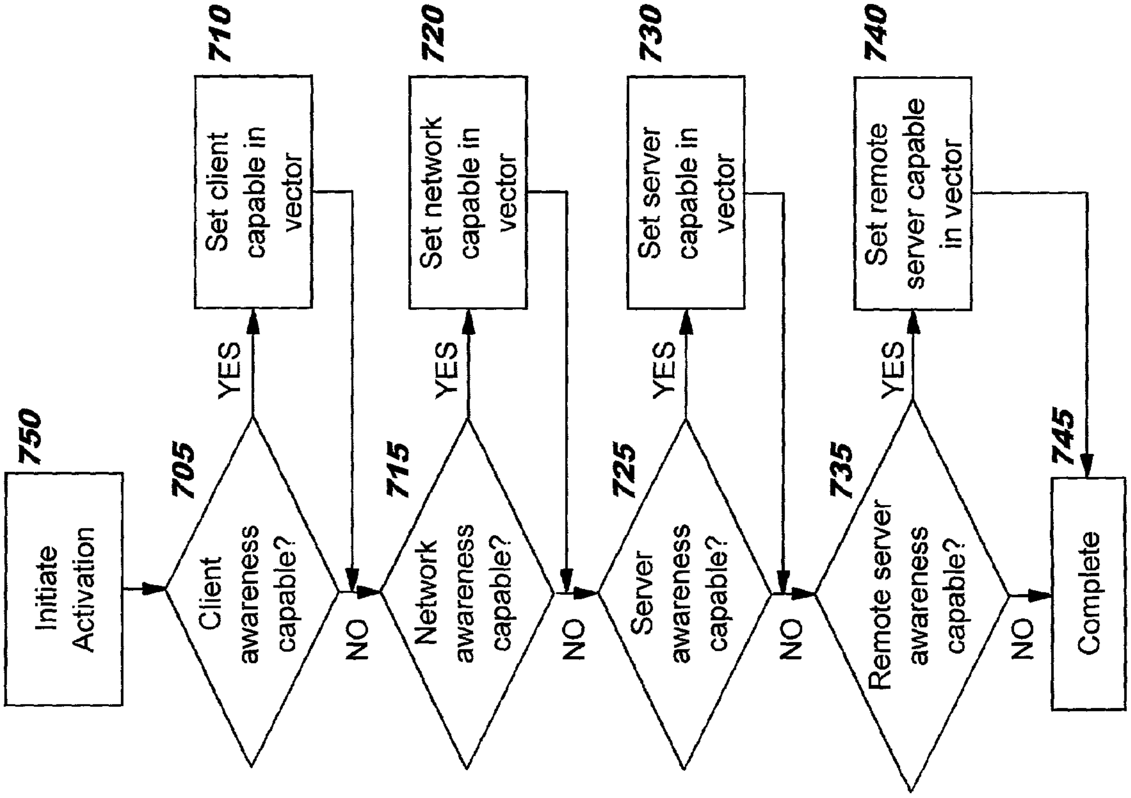
Figure 8:
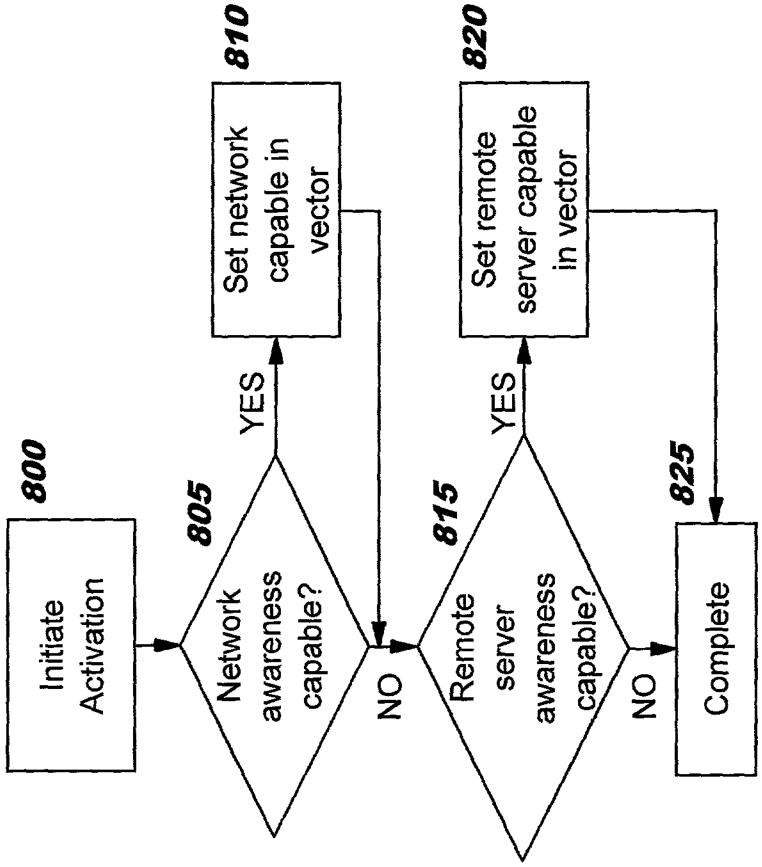
Figure 9:
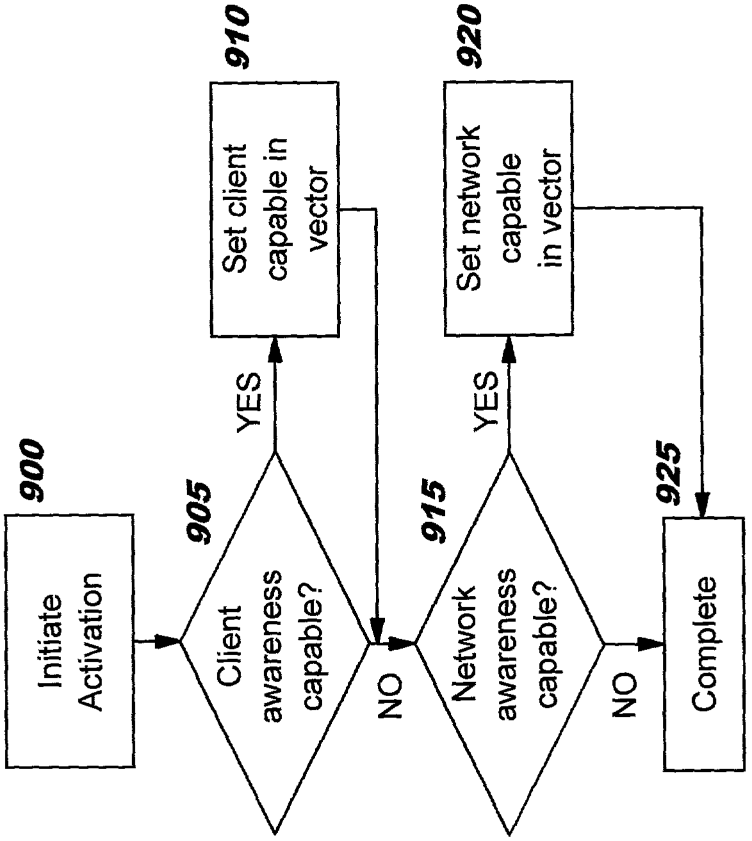
Figure 10:
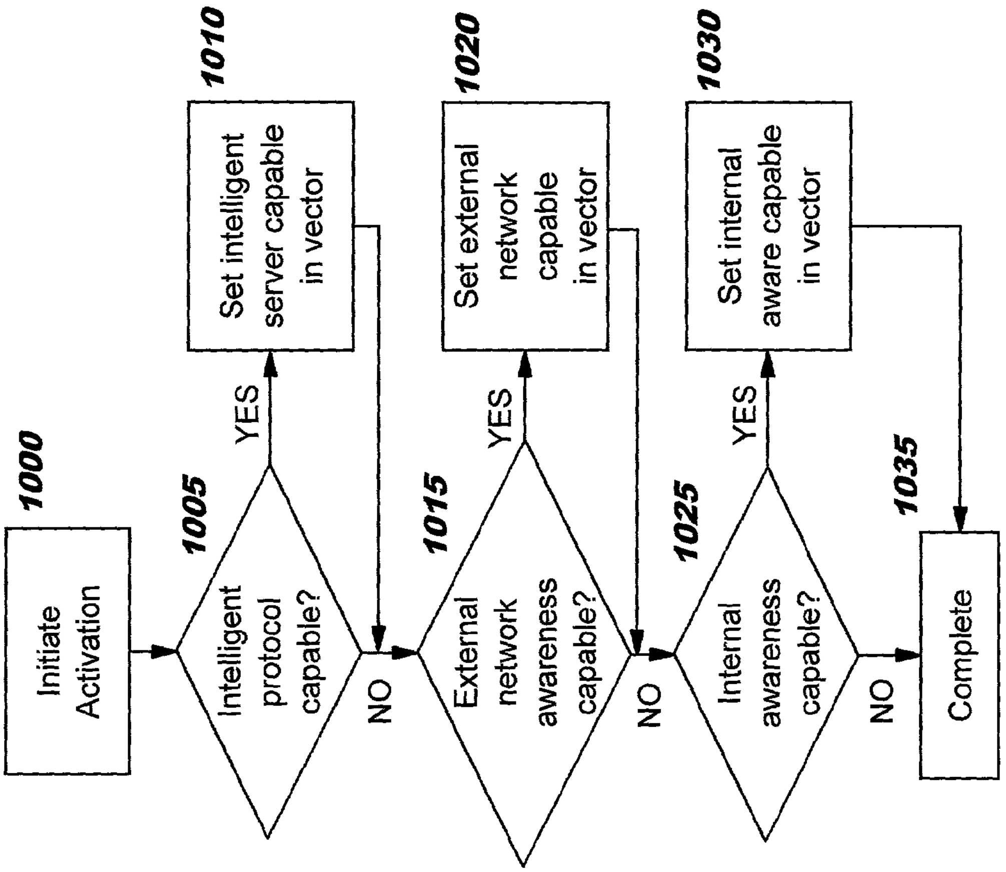

The logic in FIG. 7 shows how the policy manager creates it own internal capabilities vector 2100 as the policy manager initiates its activation (Block 700) of the present invention. In preferred embodiments, this vector is created to reflect the settings as configured by the user, or as configured by intelligent middleware, specifying what this policy manager should be "interested" in, as was discussed above. (The vectors created by other components according to FIGS. 8-10 are also preferably based on user-configured settings or settings specified by intelligent middleware.) The policy manager's internal capabilities vector (and the internal capabilities vectors of the other components represented by FIGS. 8-10) is similar to that described for the user application, and preferably uses the same structure 2100.

Creating the policy manager's version of the internal capabilities vector begins at Block 705, where a test is performed as to whether the policy manager can support receiving information from clients. This is represented in FIG. 7 as "client awareness capable?". If this test has a positive result, then Block 710 sets a value 2111 in the policy manager's internal capabilities vector 2100. Optionally, Block 710 may also set one or more values in field 2113, as has been described with reference to Block 610 of FIG. 6.

Next, Block 715 checks to see if the policy manager can support receiving information from the network. If so, Block 720 preferably sets values 2121, 2141 to indicate this information. (As was described with reference to Block 620 of FIG. 6, this logic may be modified to perform separate determinations as to the network platform, represented by area 2120 of the internal capabilities vector 2100, and as to the network protocol, represented by area 2140.)

Block 725 then checks to see if the policy manager can support receiving information from the local server. If so, Block 730 sets value 2151 to indicate this information. Finally, Block 735 checks to see the policy manager can support receiving information from the remote server. If so, Block 740 sets value 2131 to indicate this request. The policy manager's initialization of its internal capabilities vector is then complete (as indicated by Block 745).

The logic in FIG. 8 shows how the network protocol component (i.e. the protocol stack) of the local application server creates it own internal capabilities vector 2100 as the network protocol component initiates its activation (Block 800) of the present invention.

Creating the network protocol component's version of the internal capabilities vector begins at Block 805, where a test is performed as to whether the network protocol component can support receiving information from the network. If so, Block 810 preferably sets value 2141 to indicate this information.

Block 815 then checks to see if the network protocol component can support receiving information from the remote server. If so, Block 820 sets value 2131 to indicate this information. The network protocol component's initialization of its internal capabilities vector is then complete (as indicated by Block 825).

Note that the logic in FIG. 8 does not test for as many types of support as were tested in FIGS. 6 and 7 (for example, client awareness has been omitted). This is because such information is not deemed pertinent to network protocol. Similarly, FIGS. 9 and 10 specify processing only for the components which are deemed pertinent for that particular case.

FIG. 9 illustrates logic that may be used by a remote server to create it own internal capabilities vector 2100 as the remote server initiates its activation (Block 900) of the present invention.

Creating the remote server's version of the internal capabilities vector begins at Block 905, where a test is performed as to whether the remote server can support receiving information from clients. If so, Block 910 preferably sets value 2111 to indicate this information.

Block 915 then checks to see if the remote server can support receiving information from the network. If so, Block 920 sets value 2121 to indicate this information. The remote server's initialization of its internal capabilities vector is then complete (as indicated by Block 925).

FIG. 10 illustrates logic that may be used by a network platform component (such as a switch or router) to create it own internal capabilities vector 2100 as the network platform component initiates its activation (Block 1000) of the present invention.

Creating the network platform component's version of the internal capabilities vector begins at Block 1005, where a test is performed as to whether the network platform component is intelligent protocol capable. If so, Block 1010 preferably sets value 2121 to indicate this information.

The logic in Blocks 1015-1030 performs checks regarding options which may be supported. Block 1015 then checks to see if the network platform component has external network awareness capability. If so, Block 1020 preferably sets a value in options field 2123 to indicate this information. Next, Block 1025 checks to see if the network platform component has internal awareness capability. (That is, the network platform component asks whether it can understand its own internals.) If so, Block 1030 preferably sets a value in options field 2123 to indicate this information. The network platform component's initialization of its internal capabilities vector is then complete (as indicated by Block 1035).

At this point, the components have each activated, and created internal vectors that represent their capabilities/requests. The flowcharts in FIGS. 11-20 illustrate logic that may be used in preferred embodiments to exchange information among components, thereby enabling the executing application to dynamically take an appropriate prioritization action.

Figure 11:
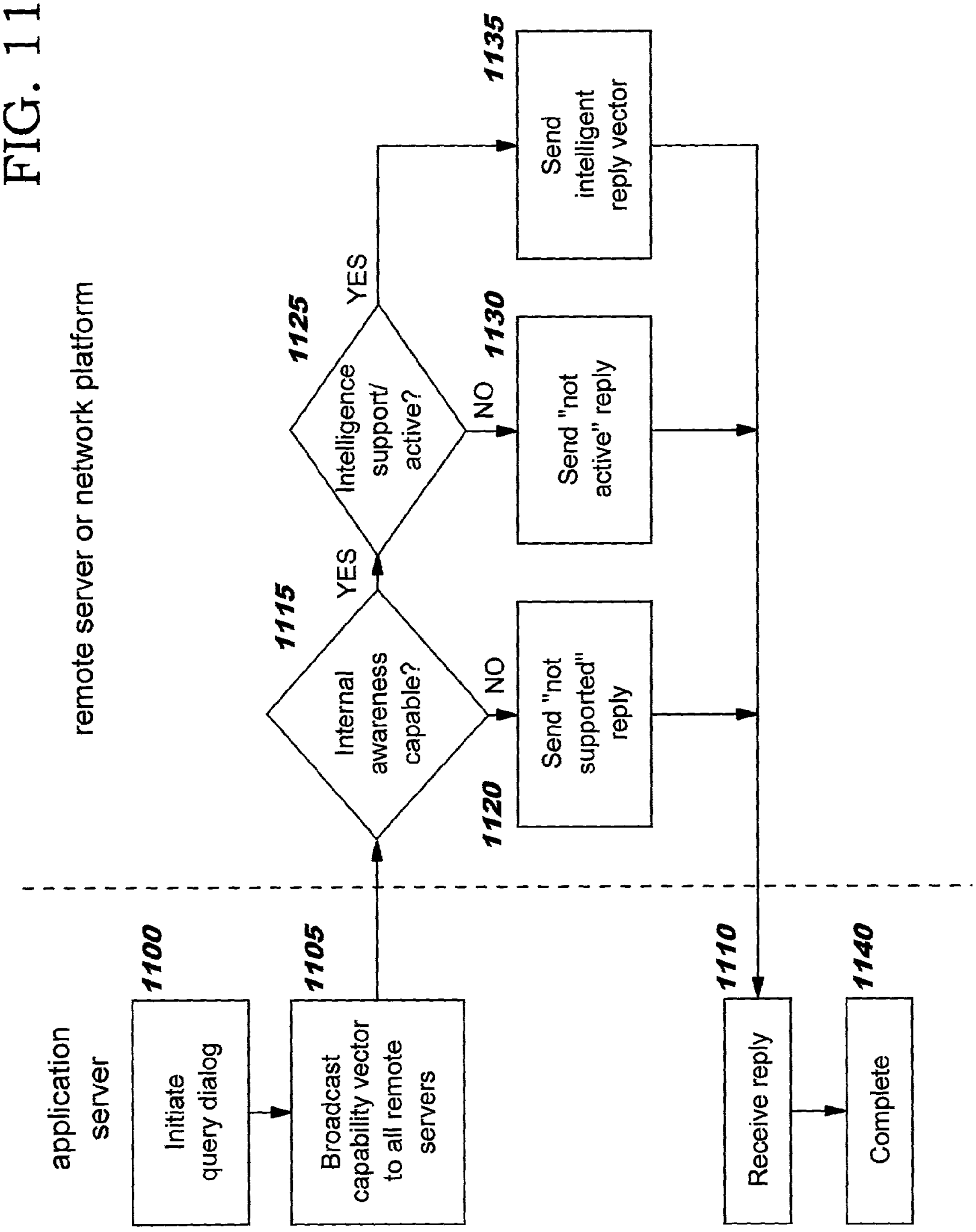

FIG. 11 illustrates a remote query dialog that is preferably used by the policy manager in the applications server on which the application of interest is executing, and comprises sending a query to each remote server or network platform to dynamically determine their capabilities for use with the present invention. The remote component (i.e. remote server or network platform, as applicable) then responds with an indication of whether it is capable of reporting status information according to the present invention, which may also be described as the remote component having "intelligent environmental awareness". (The policy manager preferably broadcasts this query to a set of targets, using destination addresses obtained from a table or other structure containing network addresses of the target components to which the query should be sent. Or, the query might be sent to particular groups of network addresses, using a network address mask. As another alternative, instead of using statically-defined target destination addresses, the destination addresses may be dynamically determined via name(s) or address(es). The manner in which the target components is determined is outside the scope of the present invention.)

The policy manager initiates (Block 1100) the query process, as may be required, and then sends (Block 1105) the broadcast message to policy agents or feedback components (referred to hereinafter as "remote policy agents" residing in the remote servers and/or network platform components. In preferred embodiments, this query message comprises a copy of the application server's internal capabilities vector, which was created according to the logic in FIG. 6.

The processing in Blocks 1115-1135 is performed in each of the receiving remote servers and network platforms. Upon receiving the query from the policy manager, a test is performed (Block 1115) to see if this remote component is capable of internal awareness. If this test has a negative result, this is typically an indication that the component does not understand the query, and therefore does not support the techniques of the present invention. Thus, in Block 1120, a "not supported" response is returned to the querying policy manager, and the processing for FIG. 11 in the remote component ends. Otherwise, when the test in Block 1120 has a positive result, another test is made in Block 1125 to see if this remote component currently supports the status reporting functions of the present invention. If so, then Block 1135 sends a reply message indicating this remote component's support; otherwise, Block 1130 sends a reply message indicating that, although the query message was understood, the support is not presently available or is not currently active. (This latter case may happen, for example, when the user has configured the remote component not to participate.) The reply messages sent from Blocks 1130 and 1135 are described in more detail below.

The policy agent receives each inbound response (Block 1110), and the process completes (Block 1140).

The reply message sent by each remote component at Block 1130 or 1135, as appropriate, is preferably structured as an "external capabilities vector" of the form illustrated by example in FIG. 22 (see element 2200). Use of this vector 2200 enables communication among systems to determine cross-system capabilities. As can be seen by inspection, the primary difference between the external capabilities vector 2200 and the internal capabilities vector 2100 is the presence of the "system identifier" functional area 2210. This system identifier information is used by the receiving policy manager to create a list of systems comprising the intelligent network (i.e. those remote components which can respond to the policy manager's query messages). The remaining fields of the vector 2200 may be structured in the same manner as in the internal capabilities vector 2100; alternatively, the external capabilities vector 2200 can be re-structured such that only those fields that apply to a particular remote component are included. (That is, component-specific forms of the vector may be used, if desired.)

Optionally, an implementation of the present invention may include this vector 2200 within an existing packet in order to avoid an additional network flow.

To create its outbound version of vector 2200, a remote component fills in the received query vector such that the component's available functions and options are identified to the requester. In preferred embodiments, all applicable functions are indicated in the outbound vector, regardless of which "requested" fields were set by the policy manager in its query. The remote component also fills in fields 2211, 2212, 2213, indicating its system type (e.g. whether it is a remote server or a network platform); its identifier type (e.g. whether the identifier in field 2213 is a name, an address, or some other type of information); and its actual system identifier, respectively. (In alternative embodiments, the remote component may respond only to those fields for which the "required" indicator is set.)

FIGS. 12-15 depict logic that may be used to perform a local query of the application server and its components, to determine their support for the intelligent environmental awareness functions of the present invention. Beginning at Block 1200, the user application initiates the processing (which may occur in response to a trigger such as reaching some threshold, occurrence of a particular event, expiration of a timer, etc.). In Block 1205, the application sends a request (typically, via its policy manager) for the local middleware's capabilities. Upon receiving this request, the middleware preferably sends a request (Block 1210) to the local network protocol component, asking for its capabilities. When the network protocol component receives the request, it completes its response (Block 1215) and returns (Block 1220) that response to the requesting middleware. The network protocol component's response is preferably created from analyzing its own internal capabilities vector (see the discussion of FIG. 8), and setting "available" fields and options according to the "required" fields from the inbound query to create a modified internal capabilities vector.

When the middleware receives the network protocol component's response, it saves a copy of the vector from that response (Block 1225) and modifies that copy to indicate its own capabilities. That is, the vector received from the network protocol component will have values set in the network protocol component functional area 2040. The middleware then sets values in functional area 2050, using its own internal capabilities vector (see the discussion of FIG. 6) as input. In this manner, the vector resulting from Block 1225 shows what the policy manager can support for internal information.

Figure 12:
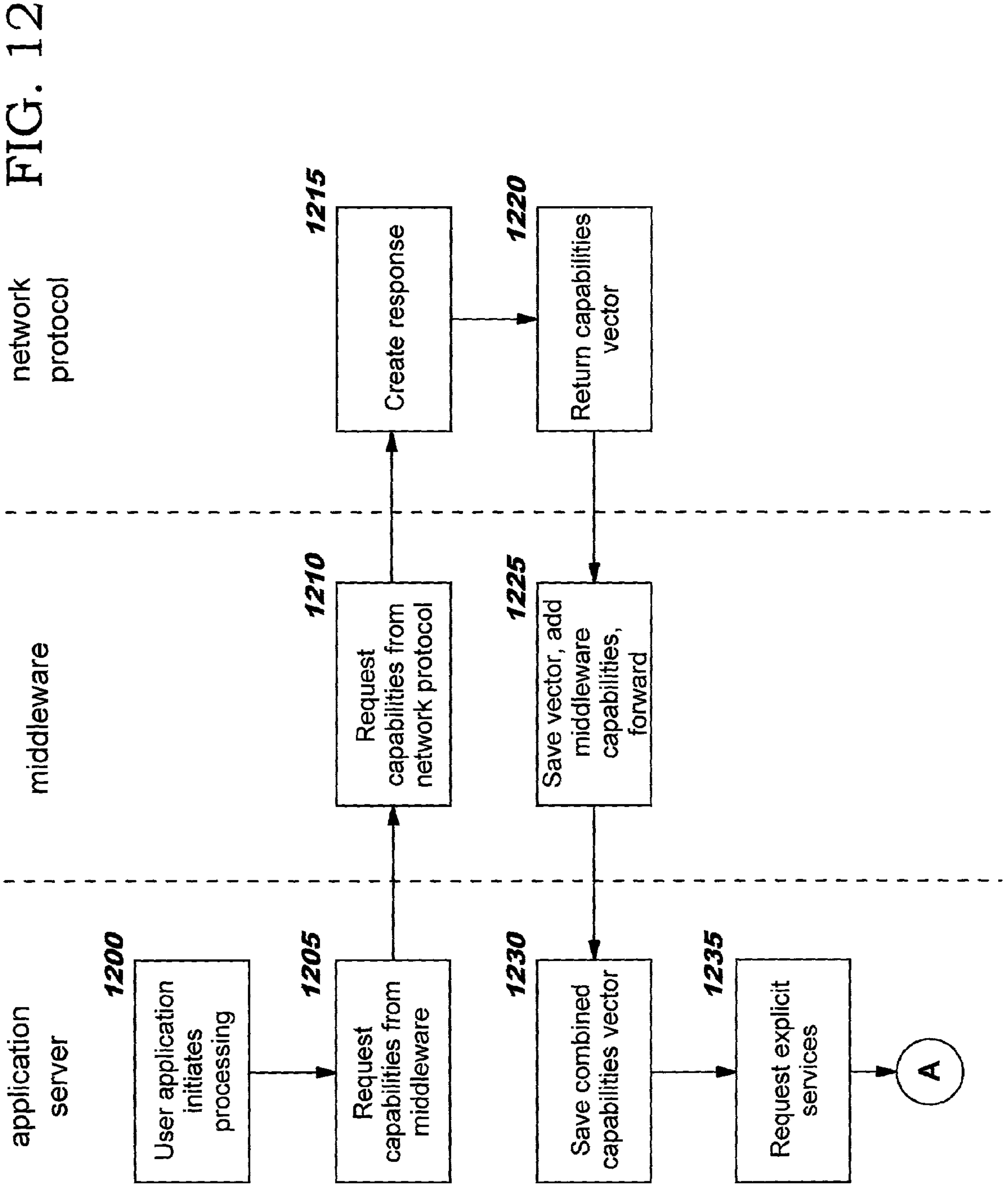

Note that the processing in FIG. 12 shows a logical flow of what preferably occurs. If the middleware and application have access to the same storage, then the middleware may update that storage in place without passing a separate "copy" to the application. Note also that an application may have many active connections at a point in time. Thus, it will look at all returned vectors to determine what was requested and what is actually available for that particular responding component.

Figure 13:
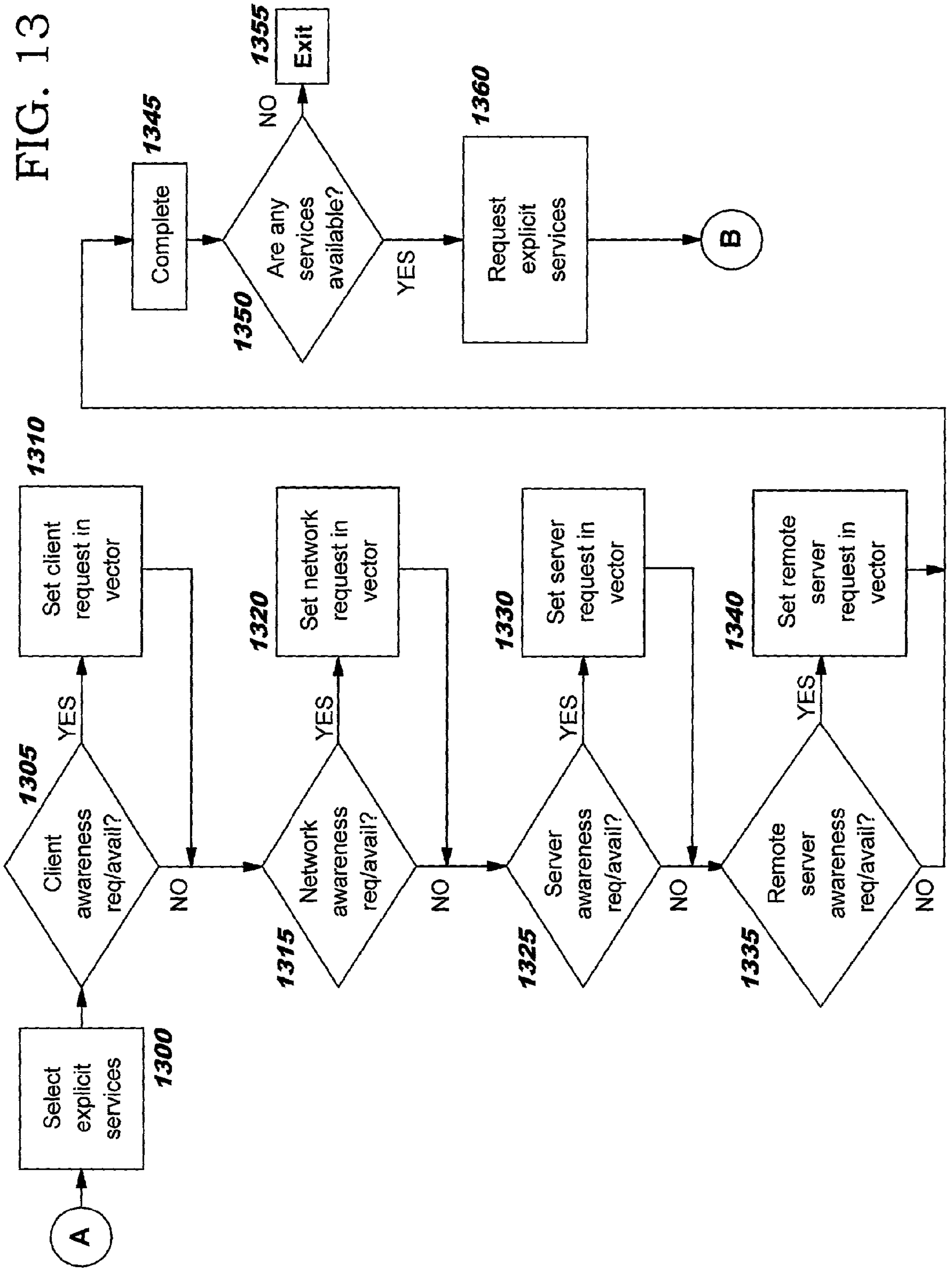

Upon receiving the combined vector, the vector is saved (Block 1230), and processing then continues to Block 1235, which indicates that an explicit request will be made for determining what services/support are currently available. FIG. 13 shows this process in more detail.

At Block 1300, the explicit services which are to be queried are selected. Blocks 1305-1340 show one example of how this selection can be made. (Alternatives include consulting a fixed list or perhaps a user-specified list.) Block 1305 checks to see if client awareness is both requested and available, with reference to the vector received at Block 1230. If so, Block 1310 sets a client query indicator to indicate this request.

An "explicit service request" vector is preferably built for this purpose during the processing of FIG. 13. (See element 2300 in FIG. 23.) The explicit service request vector is used to request that notification of specific environmental changes are transmitted to the user application (or, as stated earlier, to the intelligent middleware acting on it's behalf). As in the case of the capabilities vectors 2100, 2200, multiple functions and options may be requested in the explicit service request vector 2300. The primary difference between the capabilities vectors 2100, 2200 and the explicit service request vector 2300 is the replacement of the "availability" field as the first field of each functional area with a "return code" field, where the return codes are used to indicate whether the request was successful. (Note that this technique supports a "partial success" approach, whereby selected return codes may be positive while others are negative. An implementation may choose to proceed when mixed return codes are present. Alternatively, an implementation may choose to proceed only when all return codes indicate success.) In addition to adding return codes, vector 2300 uses a system identifier field 2310 (which is preferably analogous to system identifier field 2210) and an application identifier field 2320. This application identifier 2320 is a unique identifier, and preferably comprises a type field 2321 (indicating whether the identifier value in field 2322 is a name, address, etc.) and a field 2322 in which the actual identifier is present.

Referring again to FIG. 13, the processing of Block 1310 preferably sets field 2332 to indicate that another entity (in this case, the application server) is requesting this function.

Block 1315 tests to see if network awareness is requested and available. If so, then Block 1320 preferably sets fields 2342 and 2362. Next, Block 1325 tests to see if local server awareness is requested and available. If so, then Block 1330 preferably sets field 2372. Finally, Block 1335 tests to see if remote server awareness is requested and available. If so, then Block 1340 preferably sets field 2352.

At that point, the external request vector 2300 is complete (Block 1345), and Block 1350 tests to see if any services are currently available. For example, if the application wants to have client awareness, but the policy manager cannot provide that support, then that service is not currently available. Both the application and the policy manager must currently support a service for it to be considered "available" at Block 1350. Thus, if the test in Block 1350 has a negative result, then the process exits (Block 1355) because no information can be obtained. Otherwise, processing continues at Block 1360 to perform the request for explicit services, as described in more detail in FIGS. 14 and 15.

Figure 14:
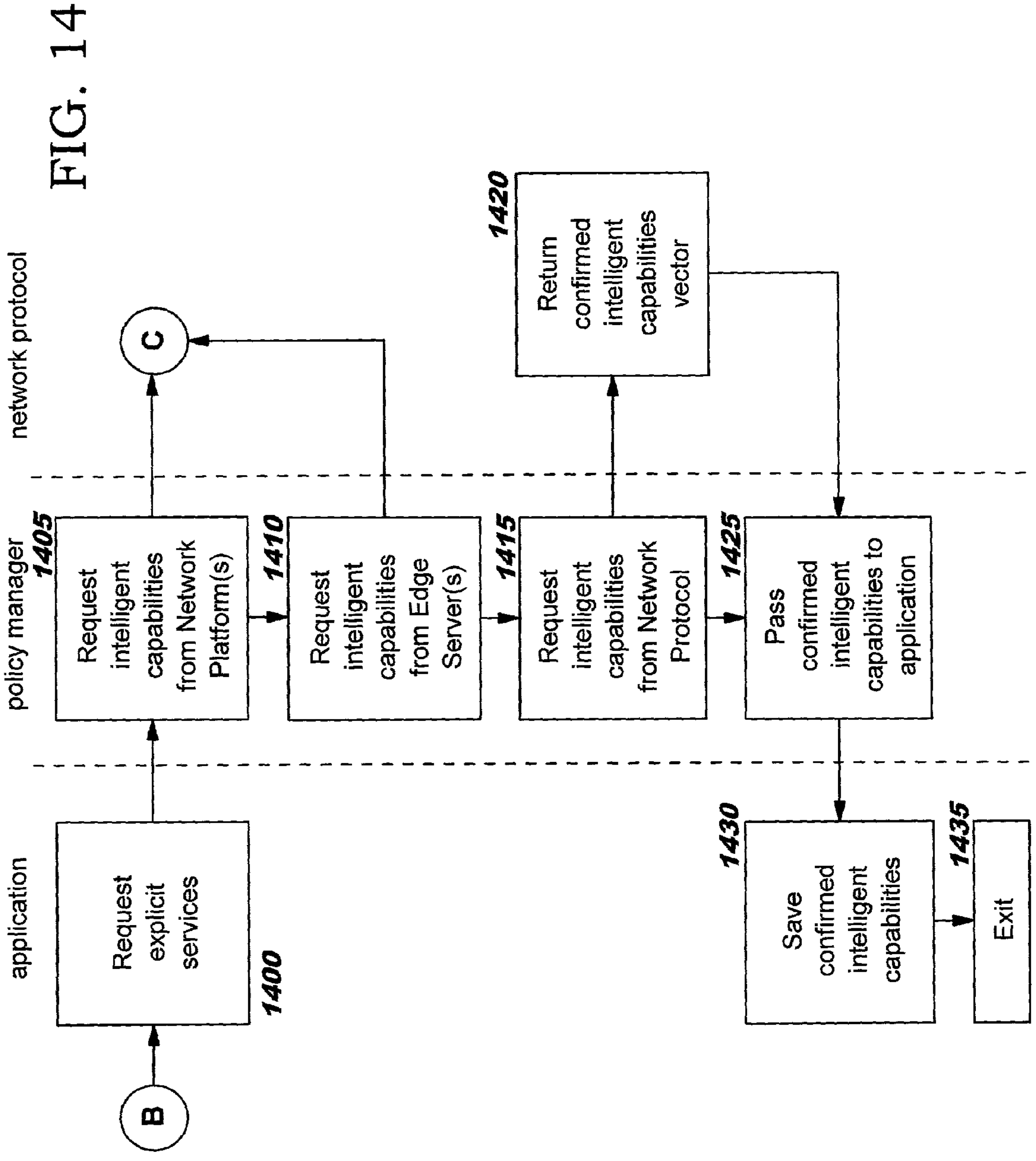
Figure 15:
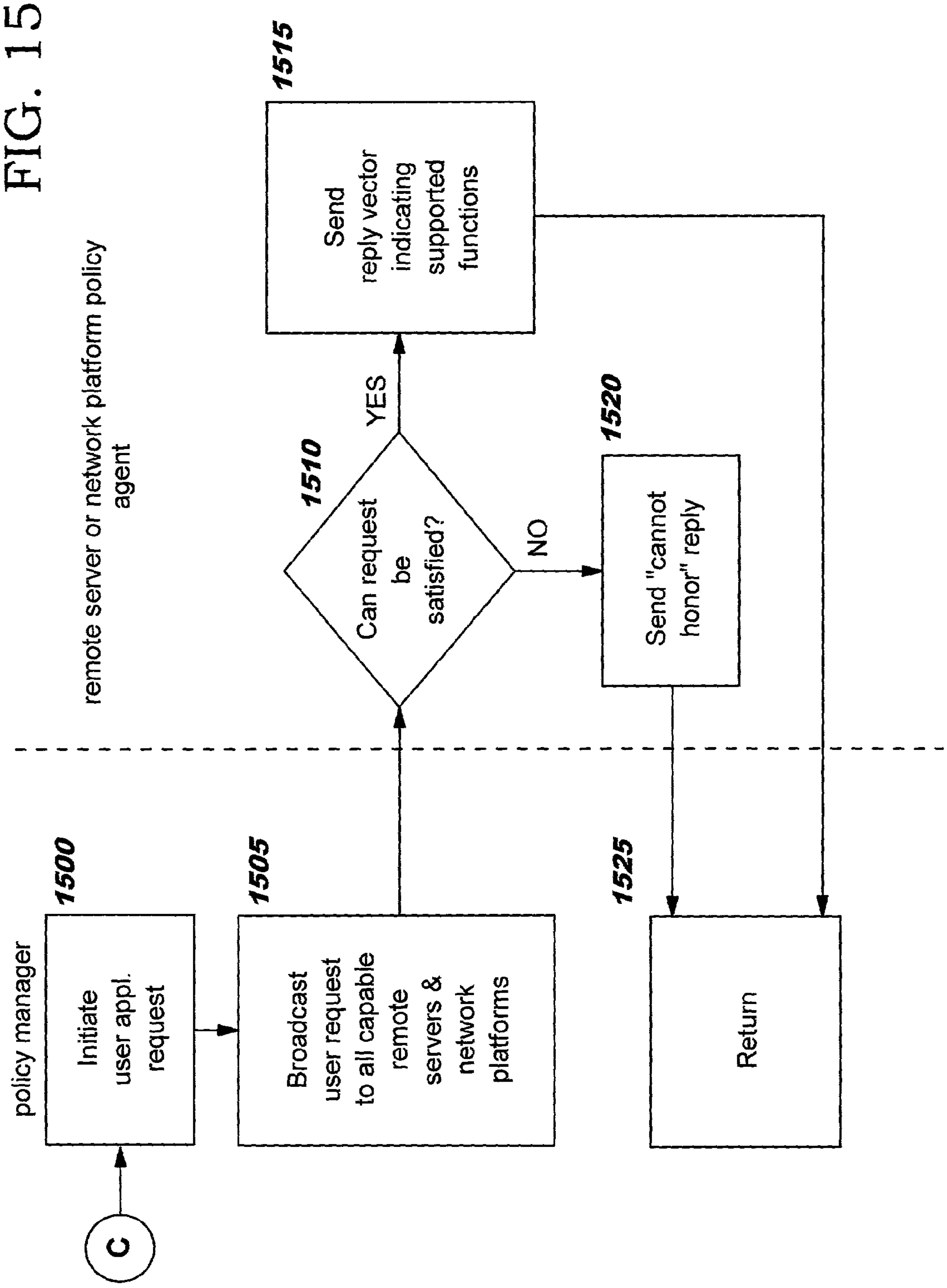

FIGS. 14 and 15 show logic underlying the issuance of requests for explicit services, processing of these requests, issuance of responses, and the receipt of the responses. At Block 1400 (which is repeated from Block 1360 of FIG. 13 for completeness), the user application requests explicit services from the policy manager. This request asks the policy manager for notification of a set of environmental changes, as well as the set of options particular to each functional area (as represented in the external services request vector 2300).

Note that the application knows before sending this request whether the requested functional support is available, because of the polling which has occurred according to previous exchanges of information.

When the policy manager receives this request, it, in turn, broadcasts a request for capabilities to all participating network platforms (Block 1405) and remote servers (Block 1410). The request is preferably created as copy of the vector 2300 received from the application, into which a unique identifier for each request is preferably added. This identifier may be created in implementation-specific ways, but preferably comprises a unique name, network address, and random identifier, or any combination thereof. This identifier enables the policy manager to determine how to correlate responses. The set of target destinations used in Blocks 1405 and 1410 may be determined statically or dynamically, in the same manner previously described with reference to Block 1105 of FIG. 11.

The processing which occurs in the remote network platforms and remote servers will be described below with reference to FIG. 15.

Continuing with the discussion of FIG. 14, in Block 1415, the policy manager requests capabilities information from the local network protocol component. Upon receiving that request, the network protocol component returns a copy of the vector (Block 1420), in which it confirms the requested capabilities. (That is, for each request in field 2362 and 2363 of the vector it receives, the network protocol component leaves the settings if it can provide that support, but turns off the settings for those which it cannot support.)

Note that it may happen in some cases that the network protocol component is unable to respond successfully to the policy manager's request. (For example, the network protocol component might be already at capacity for the number of application instances it can support.) Thus, the return code support defined for vector 2300 (see field 2361) is used to indicate whether the response has been completed or not.

When the policy manager receives the response from the network protocol component, it passes that information (Block 1425) back to the application. (Preferably, some amount of time passes before the policy manager returns this response to the application, so that the remote component has time to reply.) The application then preferably saves this information (Block 1430), after which the processing of FIG. 14 exits (Block 1435).

It should be noted that while discussions herein are in terms of complete vectors being transmitted among components, in alternative embodiments only the component-specific parts of the vectors might be used.

FIG. 15 shows in more detail the processing with which remote servers and remote network platforms can be solicited for their input, following operation of Blocks 1405 and 1410 of FIG. 14. At Block 1500, the policy manager on the local system initiates a request for information. A message is broadcast (Block 1505) to all remote servers and remote network platforms which are capable of responding (as determined in the processing of earlier flows, such as in FIG. 11). This message preferably comprises a capability vector created by the policy manager as well as an identification of the requesting application. (See the description of field 2320, above, in which this information is preferably stored.)

Upon receiving the policy manager's request, a policy agent of the remote component checks (Block 1510) to see if this request can be satisfied. If not, then in Block 1520, a response message indicating that the request cannot be honored is returned. Otherwise, Block 1515 sends a successful response in which a reply vector indicates the remote component's support of the requested functions. It may happen that a request can be partially fulfilled, or it may be possible to completely fulfill all the requested functions. Therefore, the return code fields 2341, 2351 are preferably set, along with the options fields 2343, 2353, to indicate the particular remote component's current support capabilities. The remote policy agent also preferably adds the requesting application's identifying information, along with the functions it has requested, to a local storage structure of some form. This stored information will be used by the remote policy agent to determine who has "registered" to receive notifications of this component's environmental changes.

Figure 16:
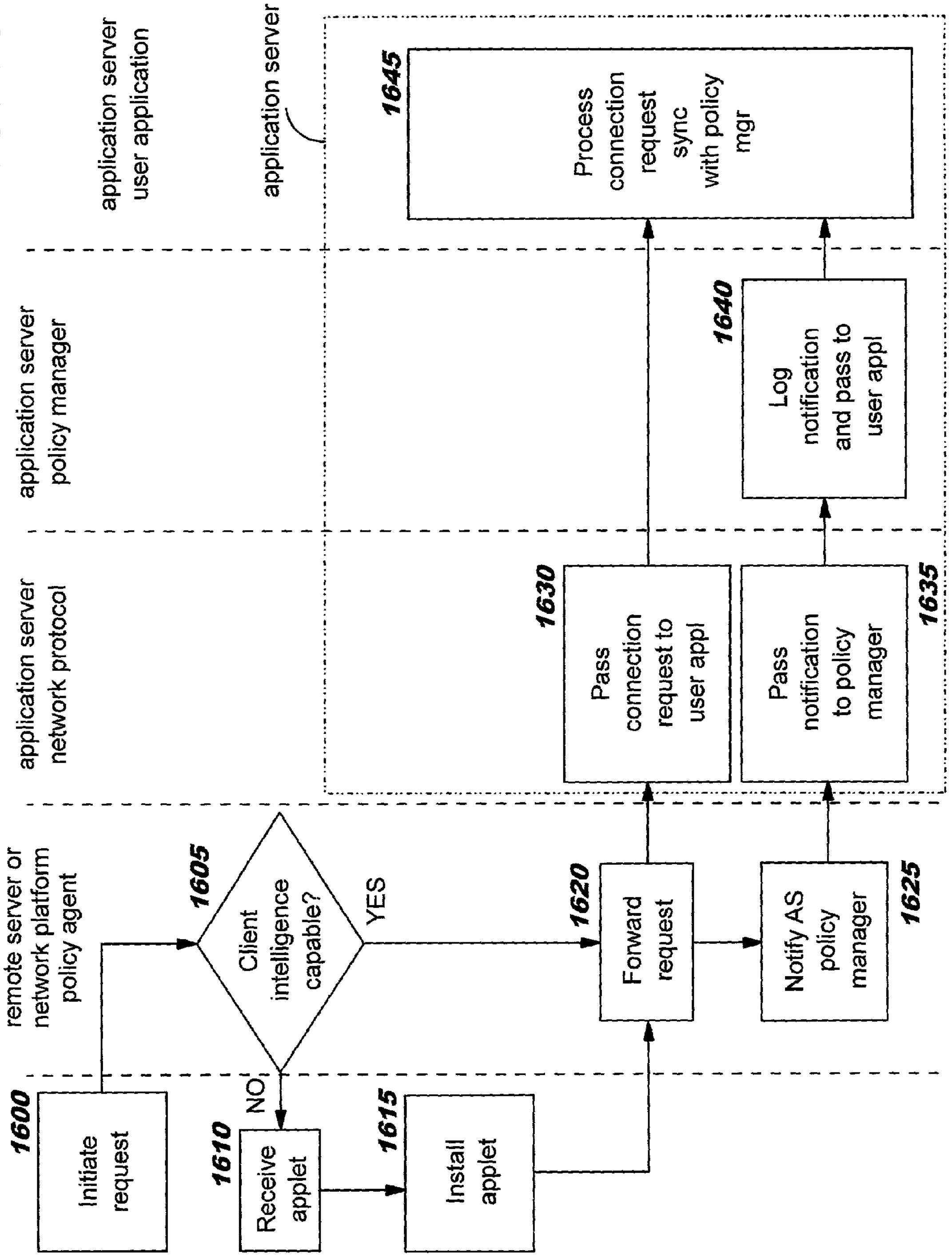

Referring now to FIG. 16, logic is shown which may be used to implement processing of an inbound connection request from a client. At Block 1600, the client initiates this request, and upon receiving that request at a remote server or network platform, Block 1605 checks to see if this client is capable of sending intelligent environmental awareness information for purposes of the present invention. If not, then optionally an applet may be sent to the client (Block 1610) to enable it to provide such support. In that case, the client preferably installs the applet (Block 1615), as processing proceeds.

In Block 1620, the remote server or network platform forwards the client's connection request to the network protocol component executing in the application server of interest (that is, the application server on which the application whose behavior may be dynamically modified is executing).

Block 1630 indicates that the network protocol component forwards the connection request to the executing user application.

In Block 1625, the remote server or network platform preferably sends a notification to the policy manager in the application server of interest, informing it of this newly-active client. The notification is received by the network protocol component of the application server of interest, which forwards it (Block 1635) to its local policy manager. Upon receiving the forwarded notification, the policy manager logs information that there is a new client (Block 1640), and passes the notification on to the executing application.

Figure 17:
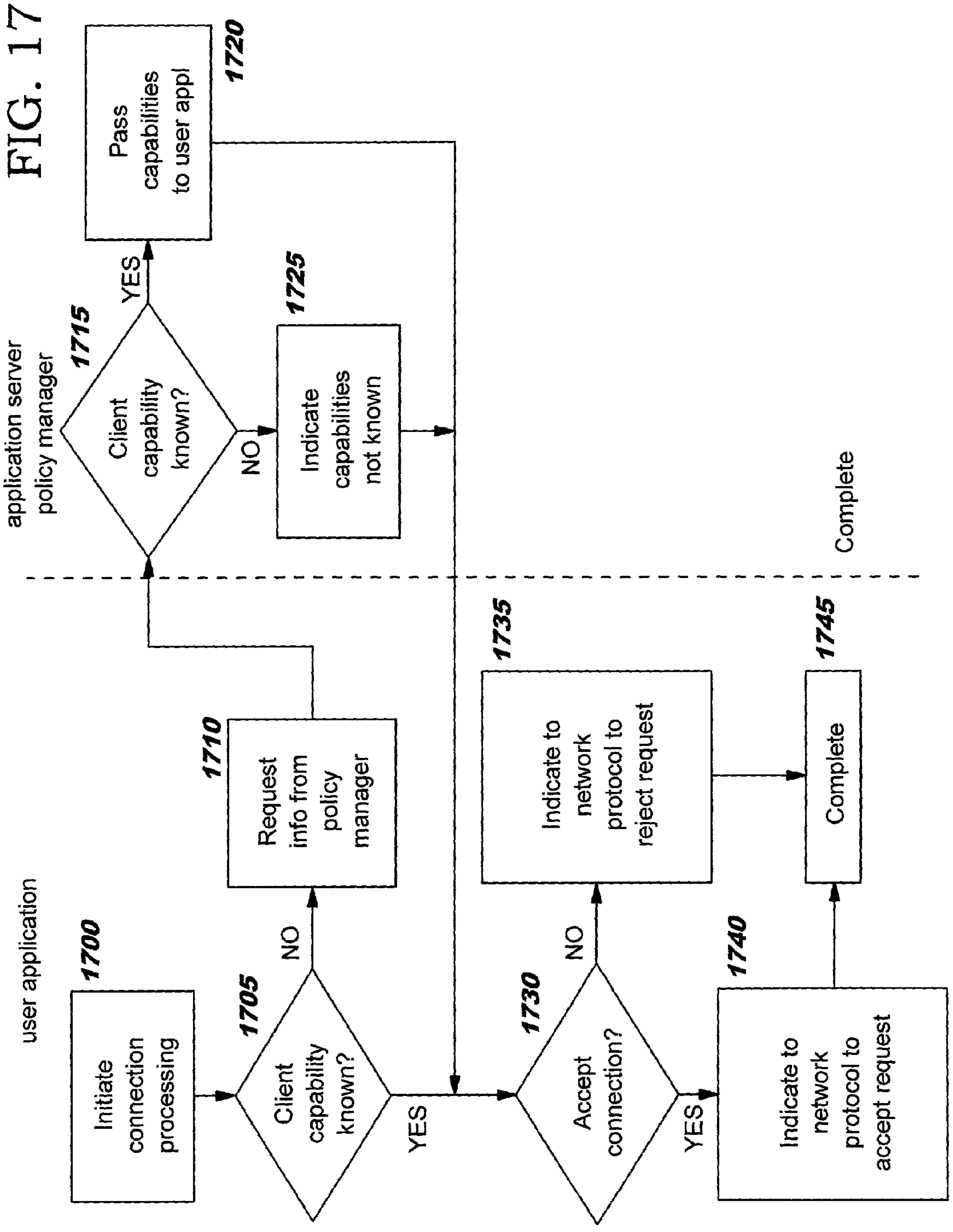

In Block 1645, the executing application receives the client's connection request, as well as the notification from the local policy manager, and processes the connection request in synchronization with the policy manager, as shown in more detail in FIG. 17.

FIG. 17 shows the user application's connection process, which begins at Block 1700. Block 1705 checks to see if capabilities are known for this client. If not, then Block 1710 requests information from the local policy manager. Upon receiving this request, the policy manager checks (Block 1715) to see if it knows this client's capabilities. If it does, it passes that capability information back to the requester (Block 1720); otherwise, a negative response is returned (Block 1725).

The user application determines whether to accept this connection request (Block 1730). If the answer is to not accept the request, then Block 1735 informs the local network protocol component to reject the request, and processing then completes (Block 1745). Otherwise, when the connection is being accepted, Block 1740 informs the local network protocol component to accept the request, and processing then completes (Block 1745).

Figure 18:
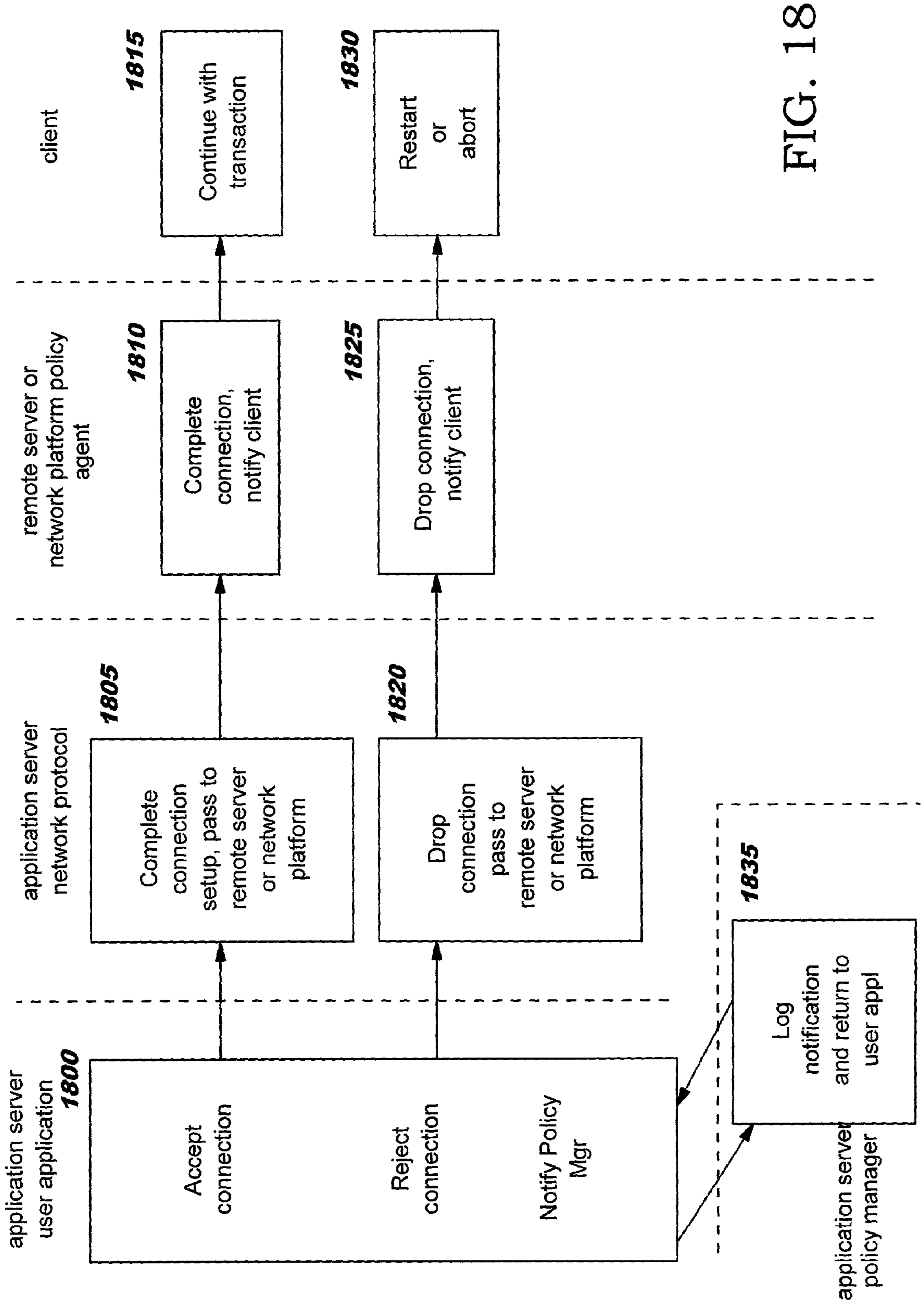

FIG. 18 shows logic underlying the processing the outbound connections, as that process affects the components of the network. Block 1800 represents several actions performed in the user application, as will now be described.

If the application decides to accept the client's connection request, then at Block 1805, the local network protocol component completes the connection setup processing, and passes a connection accepted response message to the remote server or remote network platform. That component, in turn, receives the response and completes the connection, and the remote policy agent preferably notifies the client application of the completion (Block 1810). The client then continues its processing of some type of application-specific operation or transaction (Block 1815).

On the other hand, if the application decides (in Block 1800) to reject the client's connection request, then at Block 1820, the local network protocol component drops the connection and passes a connection rejected response message to the remote server or remote network platform. That component, in turn, receives the response and also drops the connection locally, and the remote policy agent preferably notifies the client application of the rejection (Block 1825). The client then restarts or aborts its processing of the operation or transaction (Block 1830).

The user application may also notify the local policy manager (in Block 1800) of the connection's status. Upon receiving this notification, the policy manager logs the notification (Block 1835) and returns a response to the application indicating that the information has been logged.

Figure 19:
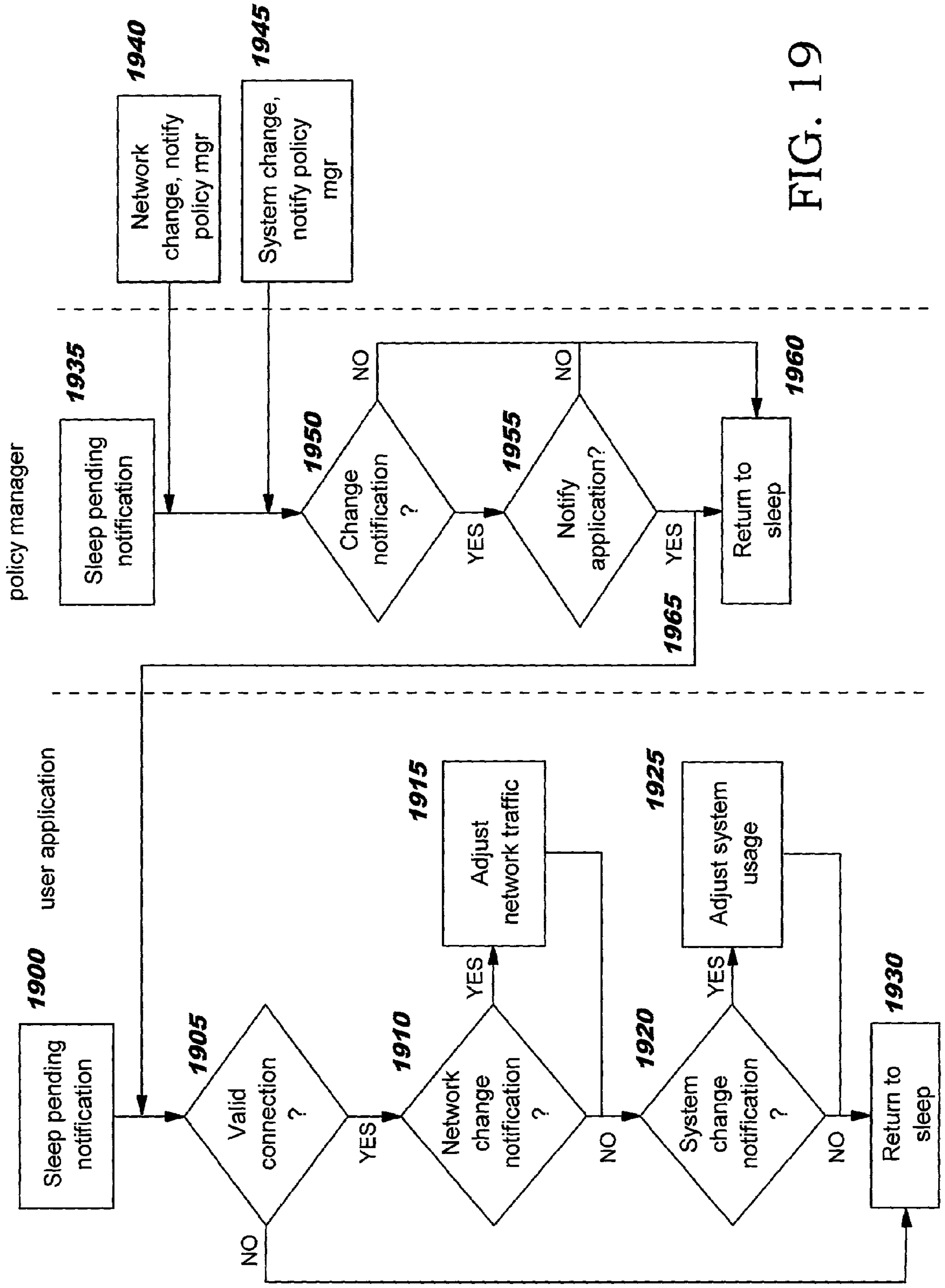
Figure 20:
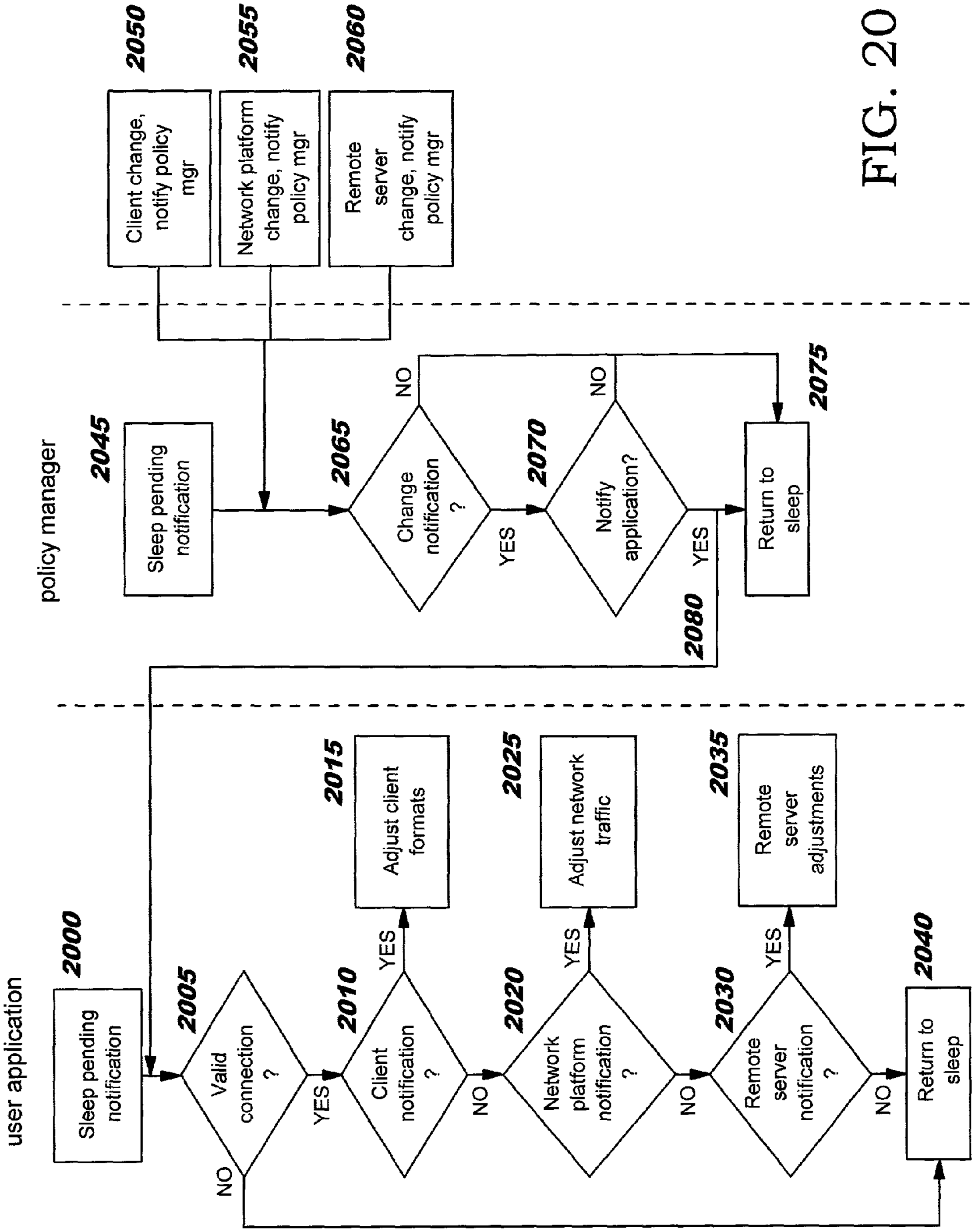

FIGS. 19 and 20 show logic that may be used to implement preferred embodiments of the notification processing which underlies changes to internal components (FIG. 19) and to external components (FIG. 20). Each of these processes will now be described.

Block 1900 of FIG. 19 indicates that the user application may "sleep" while awaiting a notification of an internal change. This is for purposes of illustrating that the change notification process may be invoked periodically, upon occurrence of some trigger, and is not meant to imply that the application halts if no notifications are received. Upon receiving a notification, Block 1905 checks to see if the notification pertains to a valid connection. If not, then no further processing is done, as shown by transferring control to Block 1930 where the application again returns to sleep (i.e. its change-notification processing suspends to await the next incoming notification).

If this notification is for a valid connection, then Block 1910 checks to see if this is a notification of a network-related change. If so, then Block 1915 preferably evaluates network-specific logic to determine whether, and in what way, the network traffic should be adjusted. As has been described earlier, examples of such adjustments include creating less data to be transmitted, requesting less data input, and/or dropping connections. Or, if the notification indicates a positive change, such as when network congestion is decreasing, then the application may choose to increase its data traffic.

Block 1920 checks to see if the change notification indicates a system-related change. (Note that a single notification message may indicate both network-related and system-related changes, including more than one type of each.) If so, then Block 1925 preferably evaluates system-specific logic to determine whether, and in what way, usage of system resources should be adjusted. As has been described earlier, examples of such adjustments include changing how threads are assigned, how storage is allocated, and so forth. The size of data objects being created by the application may also be altered. For example, the application may reduce the size of the data objects if a client has constraints that prevent it from supporting the current content level, or may increase the data object size when such constraints are lessened.

Following operation of Blocks 1920 and 1925, the user application's change-notification processing suspends to await the next incoming notification (Block 1930).

A change notification may also be received by the local policy manager. Processing to handle this situation is provided in Blocks 1935-1960. As with the user application, the policy manager's change-notification processing may be considered as sleeping until it receives a notification (Block 1935). Such changes may be sent by one or more components of the local system, including the local network protocol component (Block 1940) and the local system (Block 1945). Upon detecting a network-related change or system-related change, respectively, Blocks 1940 and 1945 send a notification to the policy manager.

Upon receiving the change notification at the policy manager, Block 1950 verifies that this is actually a change notification. If it is not, then control transfers to Block 1960, where the policy manager's change-notification processing suspends to await the next incoming notification. If this is a change notification, as determined in Block 1950, then Block 1955 checks to see if the user application should be notified. If so, then a notification is sent, as shown by arrow 1965.

As was discussed earlier, a number of implementation-specific factors may be used in making a determination as to whether an executing application should be notified of any particular conditions that arise, and these factors are taken into consideration during the processing at Block 1955.

In preferred embodiments, the mechanism used to notify the application and/or policy manager of an environmental change in FIG. 19 is by sending an "environmental change notification" vector. See vector 2400 in FIG. 24 for an example of the structure and content that may be used. This vector may be used to send a notification of changes in the internal environment (i.e. a change affecting a component of the local system), corresponding to the processing in FIG. 19, or of changes in the external environment (such as changes in a remote server, network platform, etc.), corresponding to the processing in FIG. 20. Both uses will be described together, for purposes of conciseness.

Each environmental change notification vector identifies the notification source, preferably by transmitting its system identifying information in field 2410. The current congestion level at the source may also be provided (see element 2430). Implementation-specific semantics may be attributed to this field. For example, an absence of congestion level information may be taken as an indication of severe congestion. Additional information about a congestion condition (or other type of condition, alternatively) may be indicated through use of options codes 2440. As one example of how this additional information may be used, settings may be defined that allow specification the cause(s) or likely cause(s) of the current environmental change.

The notification vector may also include function-specific codes when appropriate. For example, a network platform might provide a code indicating that a high-speed connection has been lost, thus necessitating the use of lower-speed lines. Field 2440 may be used to provide information about one or more current conditions, whereby an option code may be specified for each condition (preferably in a separate instance of field 2440, which may occur multiple times within an environmental change notification vector 2400). Note that a compound congestion condition or other type of compound condition may be indicated by providing more than one option code.

Preferably, when a system or network component determines that a change has occurred, where this change is of the type to be reported according to the present invention, that component notifies its local policy agent/manager. This notification may be communicated within the internal system using a notification vector 2400, or using other analogous means (such as by setting values in shared storage, where other components are adapted to searching this storage for notifications). The policy agent then searches its local list to determine which systems (and their associated applications) are capable of processing these environmental notifications (and which have preferably registered with the local system according to the logic in FIG. 15). For each system found, the policy agent constructs a notification vector 2400, and the vector is sent to the policy manager resident on that application server. The application identifier of each application within that server which is registered as being interested in the notification is also preferably included in the transmitted vector. See field 2420, which may be repeated in a particular instance of vector 2400. The vector processing may proceed as in FIG. 19, for those cases where the notification is sent internally, or as in FIG. 20, when vectors are sent externally. (Note that more than one application within a particular target system may be notified in response to a single vector, when both are co-resident on a single application server.)

After a policy manager receives an environmental change notification (whether as a notification vector 2400 or as some other type of internally-communicated notification, as discussed above), it preferably logs that information within a local data structure of some type before forwarding a corresponding environmental change notification vector on to all the applications (including one or more the local applications as well as remote applications) that requested such information.

The logic in FIG. 20 may be used to support external change notifications (that is, notifications which are generated in components that are external to the server that receives such notifications, and in which a determination is made as to whether an executing application should modify its behavior). For example, external notifications may be generated by clients, network platforms, and/or remote servers.

This processing begins at Block 2000, where the user application receives an externally-generated change notification and therefore interrupts a suspended change-notification processor (similar to Block 1900 of FIG. 19). Block 2005 checks to see if this notification pertains to a valid connection, and if not, the change-notification processing operation preferably returns to a suspended state (Block 2040).

When the notification is for a valid connection, Block 2010 checks to see if this notification contains client information. (Preferably, this is determined by consulting the system type field 2411.) If so, then Block 2015 determines whether, and in what manner, traffic being sent to that client should be adjusted.

Block 2020 checks to see if the notification contains network platform information. If this test has a positive result, then Block 2025 determines whether, and in what manner, the network traffic should be adjusted. (Note that a single received vector contains information from a single system type when using the vector format 2400 shown in FIG. 24. However, in alternative embodiments, a vector format may be used which may gather information from multiple sources, in which case more than one of the tests 2010, 2020, 2030 may have a positive result.)

Block 2030 checks to see if the notification contains information from a remote server. If so, then Block 2035 determines whether, and in what manner, adjustments pertaining to the remote server should be made.

Following each type of adjustment, the user application's change-notification processing suspends to await the next incoming notification (Block 2040).

An externally-generated change notification may also be received by the local policy manager. Processing to handle this situation is provided in Blocks 2045-2075. As with the user application, the policy manager's change-notification processing may be considered as sleeping until it receives a notification (Block 2045). Such changes may be sent by one or more types of external components, including clients (Block 2050), network platforms (Block 2055), and remote servers (Block 2060). Upon detecting a client-related, network platform-related, or remote system-related change, respectively, Blocks 2050, 2055, and 2060 send a notification that is received by the policy manager of the system depicted in FIG. 20.

Upon receiving the change notification at the policy manager, Block 2065 verifies that this is actually a change notification. If it is not, then control transfers to Block 2075, where the policy manager's change-notification processing suspends to await the next incoming notification. If this is a change notification, as determined in Block 2065, then Block 2070 checks to see if the user application should be notified. If so, then a notification is sent, as shown by arrow 2080. A number of implementation-specific factors may be used in making the determination in Block 2070.

Figure 25:
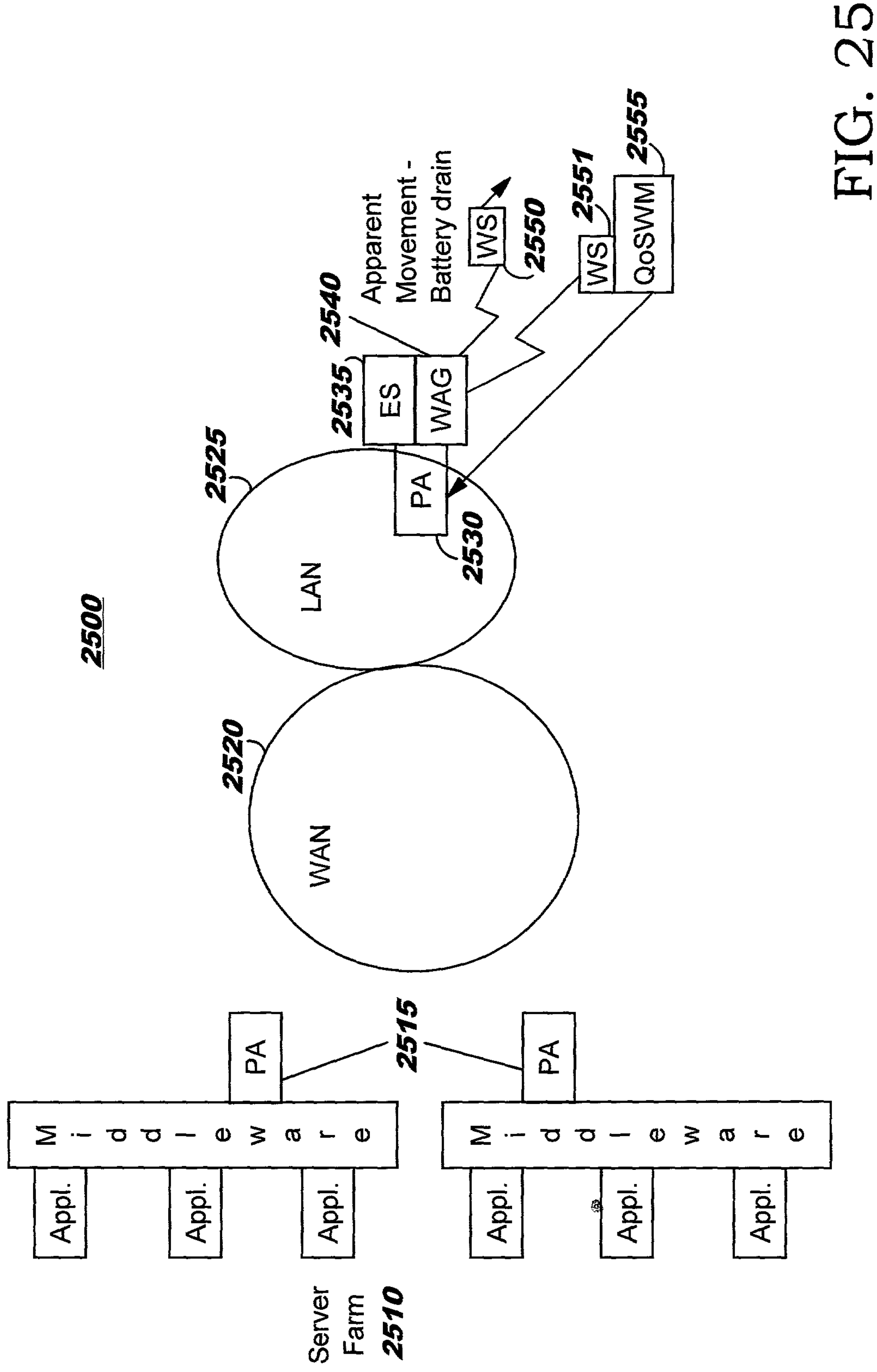
FIG. 25 provides a diagram illustrating a scenario that is used to describe operation of preferred embodiments of the present invention.

An example scenario illustrating use of the present invention will now be provided with reference to the diagram in FIG. 25. The environment in this example is a relative simply network 2500 where remote wireless stations (denoted as "WS" 2550, 2551 in the figure) are connected to a server farm or cluster 2510 first through a LAN 2525 and then by a WAN 2520. In this example, suppose that one of the wireless workstations 2551 is either moving away from the transmitter it is using or is undergoing battery drain. Therefore, it is losing its capability to receive information from the server cluster and/or its ability to process the information it has already received.

A monitoring component 2555 (shown as "QoSWM" in the figure, for "QoS Wireless Monitor") in the workstation 2551 detects the loss of capability, using techniques which do not form part of the present invention. However, this monitoring component is adapted for sending notifications of the type disclosed herein. Therefore, the monitoring component notifies a policy agent 2530 of the changed environmental conditions of workstation 2551. This policy agent, in the example, resides in the wireless application gateway ("WAG") 2540 of a remote server 2535 ("ES" in the figure). (In the example, the remote server 2535 is an IBM WebSphere® Edge Server. "WebSphere" is a registered trademark of IBM.) The monitoring component 2555 might alternatively be located in the WAG 2540.

Upon receiving the environmental change notification (which is preferably an environmental change notification vector 2400), the policy agent 2530 notifies the policy agents/managers 2515 which are resident on the server instances in the server cluster 2510. (Note that policy agents and managers preferably keep track of all remote agents/managers, so they know where the notifications should be sent, as has been described.) Upon receiving the notification, the policy agents/managers in the server instances determine whether to forward this information on to a locally-executing application, using decision-making criteria of some form. An application may then decide to close the connection to workstation 2551, or to send less data to the workstation, etc. (It may be possible for the workstation client to continue operating under the changed relationship with the server application. This might, for example, allow the user to request a graceful close of the client application before all battery power is lost.)

As has been demonstrated, the present invention provides advantageous techniques for improving traffic management, wherein an executing application responds to current environmental conditions to alter the traffic it generates. By reducing the amount of traffic sent to a system and/or network, it becomes possible to provide an overall solution to traffic management, thereby ensuring that user QoS expectations can be met. The disclosed techniques may be adapted to conveying many different types of changing conditions. The protocol disclosed for exchanging information among components may be used for internal communications within a particular system and/or for external communications among different components of the network. The vectors which have been described provide a flexible, extensible means for communicating information internally as well as externally.

As will be appreciated by one of skill in the art, embodiments of the present invention may be provided as methods, systems, and/or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include the described preferred embodiments and all such variations and modifications as fall within the spirit and scope of the invention.

What is claimed is:

1. A method of improving traffic management in a computing network, comprising steps of:

detecting a changed environmental condition comprising a changed capacity to transmit data over the network due to congestion or component malfunction on that network;

determining at a currently-executing application, based on the changed environmental condition, whether the currently-executing application should modify a behavior of the currently-executing application, wherein said currently-executing application comprises settings defining which components of said network the currently-executing application should consider is determining whether to modify behavior; and in response to a positive determination to modify behavior of the currently-executing application, modifying, by the currently-executing application, the behavior of the currently-executing application, wherein the modification of the behavior of the currently-executing application changes an amount of data that the currently-executing application seeks to send or receive over the network specifically in response to the detection of the changed environmental condition comprising a changed capacity to transmit data over the network due to congestion or component malfunction on that network;

wherein detecting said changed environmental condition comprises receiving messages from components of the network based on internal capability vectors kept by each such component that dynamically specify that component's current capabilities.

2. The method according to claim 1, wherein the modification comprises any of: reducing a size of one or more data objects generated by the currently-executing application; reducing requests for data retrieval by the currently-executing application; and dropping one or more connections with the currently-executing application.

3. The method according to claim 1, further comprising generating a request vector for status information from components in said network, said vector based on said settings defining which components of said network the currently-executing application should consider in determining whether to modify behavior.

4. The method according to claim 1, wherein said settings defining which components of said network the currently-executing application should consider in determining whether to modify behavior dictate any combination of client awareness, network awareness, server awareness and remote server awareness.

5. The method according to claim 1, wherein the changed environmental condition comprises a reduction in network congestion and wherein the modification comprises increasing a size of one or more data objects generated by the currently-executing application specifically in response to the detection of the changed environmental condition.

6. The method according to claim 1, wherein the changed environmental condition comprises a reduction in network congestion and wherein the modification comprises increasing a volume of data retrieval as requested by the currently-executing application specifically in response to the detection of the changed environmental condition.

7. The method according to claim 1, wherein the modification comprises changing thread assignments of the currently-executing application.

8. The method according to claim 1, wherein the modification comprises changing the currently-executing application's use of one or more other applications.

9. The method according to claim 1, wherein the changed environmental condition pertains to system-related conditions.

10. The method according to claim 1, wherein the changed environmental condition pertains to network-related conditions.

11. The method according to claim 1, wherein the changed environmental condition pertains to client-related conditions in one or more clients of the currently-executing application.

12. The method according to claim 1, further comprising generating a notification of the detected condition for the currently-executing application;

wherein the changed environmental condition occurred internally to a system in which the currently-executing application is executing.

13. The method according to claim 12, wherein the generated notification pertains to a condition of a local network protocol stack.

14. The method according to claim 12, wherein the generated notification pertains to a condition of the system in which the currently-executing application is executing.

15. The method according to claim 12, wherein the notification is analyzed by a policy manager component of the system in which the currently-executing application is executing.

16. The method according to claim 1, further comprising generating a notification of the detected condition for the currently-executing application;

wherein the changed environmental condition occurred externally to a system in which the currently-executing application is executing.

17. The method according to claim 16, wherein the generated notification pertains to a condition of a client of the currently-executing application.

18. The method according to claim 16, wherein the generated notification pertains to a condition of a remote network platform.

19. The method according to claim 16, wherein the generated notification pertains to a condition of a remote server with which the currently-executing application is communicating.

20. The method according to claim 19, wherein the modification comprises making adjustments pertaining to the remote server.

21. The method according to claim 1, wherein the changed environmental condition comprises a buffer shortage.

22. The method according to claim 1, wherein the changed environmental condition comprises a thread scheduling problem.

23. The method of claim 1, further comprising requesting said messages using an internal capabilities request vector of the currently-executing application.

24. The method of claim 1, wherein said messages specify a level of congestion for a particular component of the network.

25. An application server for improving traffic management in a computing network, comprising:

a user application for execution by the application server; and a policy manager to receive input from system management functions and network protocol functions, wherein said policy manager is to detect a changed environmental condition comprising a reduced capacity to transmit data over the network due to congestion or component malfunction on that network;

wherein said policy manager is to generate a notification of the detected condition for the user application; and wherein said user application responds to the notification by determining whether said user application should modify its own behavior in response to said changed environmental condition, the determination being based, at least in part on, a prioritization of that particular user application in a Quality of Service scheme;

wherein the modification of the behavior of the user application reduces an amount of data that the user application seeks to send or receive over the network specifically in response to the detection of the changed environmental condition comprising a reduced capacity to transmit data over the network due specifically to congestion or component malfunction on that network;

wherein said policy manager detects said changed environmental condition by receiving messages from components of the network based on internal capability vectors kept by each such component that dynamically specify that component's current capabilities.

* * * * *